US012435705B2

(12) United States Patent
Khan et al.

(10) Patent No.: US 12,435,705 B2
(45) Date of Patent: Oct. 7, 2025

(54) INTERVENTION COMBINATIONS TO BOOST WELL PERFORMANCE IN GEOTHERMAL SYSTEMS

(71) Applicant: Schlumberger Technology Corporation, Sugar Land, TX (US)

(72) Inventors: Abdul Muqtadir Khan, Sugar Land, TX (US); Ashley Bernard Johnson, Cambridge (GB); Benoit Deville, Sugar Land, TX (US); Isaac Aviles, Sugar Land, TX (US); Santiago Hassig Fonseca, Sugar Land, TX (US); Richard L. Christie, Sugar Land, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 18/678,978

(22) Filed: May 30, 2024

(65) Prior Publication Data

US 2024/0401572 A1 Dec. 5, 2024

Related U.S. Application Data

(63) Continuation-in-part of application No. 18/479,187, filed on Oct. 2, 2023.

(Continued)

(51) Int. Cl.

*F03G 4/00* (2006.01)
*E21B 29/00* (2006.01)
*E21B 43/27* (2006.01)

(52) U.S. Cl.

CPC ............ *F03G 4/072* (2021.08); *E21B 29/002* (2013.01); *E21B 43/27* (2020.05)

(58) Field of Classification Search

CPC ....... F24T 10/20; F24T 10/30; F24T 2010/50; F24T 2010/53; F24T 2010/56;

(Continued)

(56) References Cited

U.S. PATENT DOCUMENTS

| | | | | |
|---|---|---|---|---|
| 3,642,068 A * | 2/1972 | Fitch | ........................ | E21B 43/26 166/308.1 |
| 8,685,187 B2 | 4/2014 | Han | | |

(Continued)

FOREIGN PATENT DOCUMENTS

| | | |
|---|---|---|
| CN | 105840146 A | 8/2016 |
| CN | 108756843 A | 11/2018 |

(Continued)

OTHER PUBLICATIONS

Al-Nakhli, A. R., "Chemically-Induced Pressure Pulse: A New Fracturing Technology for Unconventional Reservoirs", SPE-172551-MS, presented at the SPE Middle East Oil Gas Show and Conference, Manama, Bahrain, 2015.

(Continued)

*Primary Examiner* — Loren C Edwards
(74) *Attorney, Agent, or Firm* — Stephen M. Cordes

(57) ABSTRACT

Methods are provided for extracting thermal energy from a geothermal reservoir having at least one feature extending therethrough, which involve drilling or accessing a production well that intersects the at least one feature, wherein the at least one feature provides a flow path of pressurized geothermal fluid into the production well. Well log data can be analyzed to determine position of the at least one feature in the production well. One or more interventions, or combinations of interventions, can be performed to open the feature or otherwise enhance the flow rate of pressurized geothermal fluid carried by the feature into the production well. The intervention(s) can be performed on multiple (Continued)

features that connect to the production well. The method can also be applied to multiple production wells.

20 Claims, 25 Drawing Sheets

Related U.S. Application Data

(60) Provisional application No. 63/504,797, filed on May 30, 2023.

(58) Field of Classification Search
CPC .......... F24T 50/00; E21B 43/25; E21B 43/27; E21B 29/002; F03G 4/072
See application file for complete search history.

(56) References Cited

U.S. PATENT DOCUMENTS

| | | | | |
|---|---|---|---|---|
| 2006/0102343 | A1 | 5/2006 | Skinner | |
| 2010/0294494 | A1* | 11/2010 | Hefley | E21B 43/26 166/177.5 |
| 2013/0292177 | A1 | 11/2013 | Meurer | |
| 2014/0262256 | A1* | 9/2014 | Zemach | F24T 10/20 166/272.2 |
| 2015/0204174 | A1 | 7/2015 | Kresse | |
| 2015/0233218 | A1 | 8/2015 | Myhre | |
| 2015/0275638 | A1 | 10/2015 | Wang | |
| 2015/0300327 | A1 | 10/2015 | Sweatman | |
| 2017/0321934 | A1 | 11/2017 | Kruger | |
| 2018/0016895 | A1 | 1/2018 | Weng | |
| 2018/0080309 | A1 | 3/2018 | Althoff | |
| 2018/0202266 | A1 | 7/2018 | Holland | |
| 2018/0266225 | A1 | 9/2018 | Kemick | |
| 2021/0363866 | A1* | 11/2021 | Al-Nakhli | C09K 8/665 |
| 2022/0325920 | A1 | 10/2022 | Barral | |
| 2023/0045716 | A1 | 2/2023 | Normann | |
| 2023/0288099 | A1 | 9/2023 | Toews | |
| 2024/0401450 | A1 | 12/2024 | Johnson | |

FOREIGN PATENT DOCUMENTS

| | | | |
|---|---|---|---|
| CN | 111520924 | A | 8/2020 |
| CN | 112012709 | A | 12/2020 |
| CN | 113863914 | A | 12/2021 |
| JP | 2015121093 | A | 7/2015 |
| WO | 2021078766 | A1 | 4/2021 |
| WO | 2022055947 | A1 | 3/2022 |

OTHER PUBLICATIONS

Search Report and Written Opinion of International Patent Application No. PCT/US2024/031345 dated Sep. 10, 2024, 11 pages.
Combined Search and Exam Report issued in United Kingdom Patent Application No. GB2400296.6 dated Feb. 5, 2024, 5 pages.
Search Report and Written Opinion of International Patent Application No. PCT/US2024/031687 dated Sep. 24, 2024, 13 pages.
Search Report and Written Opinion of International Patent Application No. PCT/US2024/031699 dated Sep. 12, 2024, 12 pages.
Extended Search Report issued in European Patent Application No. 24204106.9 dated Jan. 24, 2025, 6 pages.

* cited by examiner

INTERVENTION COMBINATIONS TO BOOST WELL PERFORMANCE IN GEOTHERMAL SYSTEMS

CROSS-REFERENCE TO RELATED APPLICATION(S)

The present disclosure claims priority from U.S. Prov. Appl. No. 63/504,797, filed on May 30, 2023, entitled "BOOSTING WELL PERFORMANCE IN GEOTHERMAL SYSTEMS," and is a continuation-in-part of U.S. application Ser. No. 18/479,187, filed on Oct. 2, 2023 entitled "BOOSTING WELL PERFORMANCE IN GEOTHERMAL SYSTEMS," each of which are herein incorporated by reference in their entirety.

FIELD

The present disclosure relates to geothermal systems that extract thermal energy from a geothermal reservoir.

BACKGROUND

Geothermal systems that extract thermal energy (heat) from a geothermal reservoir are generating considerable interest. A conventional geothermal reservoir is a volume of subsurface rock that contains a natural source of pressurized geothermal fluid that is heated by natural geological processes below the Earth's surface. The pressurized geothermal fluid can include hot water or brine. The pressurized geothermal fluid is used as a source of thermal energy. A production well is drilled from the surface into and through the conventional geothermal reservoir, and may intersect one or more naturally-occurring fractures in the subsurface rock of the conventional geothermal reservoir. These naturally-occurring fractures provide a flow path of the pressurized geothermal fluid into the production well where it flows through the production well to the surface. The thermal energy from the geothermal fluid that flows to the surface can be extracted and used by an energy conversion plant for power generation, large scale heating or cooling, industrial/agricultural processes, or other geothermal applications.

There can be significant pressure loss and/or low flow rates where the naturally-occurring fracture intersects and fluidly couples to the production well of the system. Specifically, the aperture of a naturally-occurring fracture at the intersection of the production well can act as a flow restrictor that limits fluid flow through the fracture and into the production well. This can limit the amount of heat captured by the system and delivered to the surface, and thus decrease the productivity of the system.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

Methods for extracting thermal energy from a geothermal reservoir are disclosed. The geothermal reservoir has at least one feature (e.g., fissure, pre-existing fracture, naturally-occurring fracture) that extends through the geothermal reservoir. The feature may include, but is not limited to, a fissure, fault, or naturally-occurring fracture that extends through the geothermal reservoir. A production well can be drilled or accessed whereby the production well intersects a feature. The feature provides a flow path of pressurized geothermal fluid into the production well. Well log data can be analyzed to determine position (e.g., measured depth) of the feature in the production well. One or more interventions can be performed at a position in the production well that corresponds to the position of the at least one feature in the production well. The one or more interventions can be configured to open the feature or otherwise enhance the flow rate of pressurized geothermal fluid carried into the production well by the feature. The well log data can be analyzed to determine positions in the production well of multiple features that connect to the production well, and the intervention(s) can be performed at positions in the production well that correspond to the positions of the multiple features in the production well. The method can also be applied to multiple production wells that intersect the geothermal reservoir.

In embodiments, the intervention(s) can be configured to reduce pressure loss of fluid flow into the production well from the feature. The intervention(s) can be configured to increase the flow rate of pressurized geothermal fluid carried by the feature into the production well.

In embodiments, the pressurized geothermal fluid can include hot water and/or brine.

In embodiments, the intervention(s) can include perforating at a position in production well that corresponds to the position of the feature in the production well, wherein the perforating is configured to open the feature.

In embodiments, the perforating can increase flow area, reduce pressure loss, and increase the flow rate of pressurized geothermal fluid carried by the feature into the production well.

In embodiments, the perforating can extend through an aperture of the feature into a near wellbore region of the production well with a limited radial length less than 5 feet into the near wellbore region.

In embodiments, the perforating can include directing energy that removes rock to opens the feature. In embodiments, the perforating can employ a downhole tool that focuses and/or directs energy that enlarges the aperture of the feature and increase the flow area of the feature.

In embodiments, the perforating can include directing a high-energy process configured to remove rock to enlarge the aperture of the feature. The high-energy process may include directing a high-velocity abrasive fluid or igniting a propellant (e.g., ammonium perchlorate and aluminum) toward the wall of the production well. The high-energy process may include the detonation of one or more explosive charges or the direction of a high-energy pulse toward the wall of the production well. In embodiments, the perforating can employ a downhole tool configured to focus and/or direct the high-energy process toward the wall of the production well.

In embodiments, the perforating can include emitting a high-velocity fluid with abrasive particles that removes rock to opens the feature. In embodiments, the perforating can employ a downhole tool configured to emit the high-velocity fluid with abrasive particles that enlarges the aperture of the feature to open the feature. The downhole tool can employ rotary motion to direct a jet or jets of the high-velocity fluid about the circumference of the production well.

In embodiments, the perforating can include directing electromagnetic radiation that opens the feature. In embodiments, the perforating can employ a downhole tool configured to focus or direct electromagnetic radiation enlarges the aperture of the feature to open the feature. In embodiments, the downhole tool can employ rotary motion to direct electromagnetic radiation about the circumference of the production well.

In embodiments, the perforating can include applying high-voltage impulses that remove rock to open the feature. In embodiments, the perforating can employ a downhole tool having electrodes that contact rock and apply high-voltage impulses to the rock, wherein the applied impulses create shock waves that break apart and remove the rock to enlarge the aperture of the feature and open the feature.

In embodiments, the perforating can include emitting high-power laser that removes rock to open the feature. In embodiments, the perforating can employ a downhole tool configured to emit laser that enlarges the aperture of the feature to open the feature.

In embodiments, the perforating can include detonating at least one explosive charge such that a high-energy pressure wave results from the detonation, wherein the pressure wave removes rock to open the feature. In embodiments, the perforating can employ a downhole tool configured to support at least one explosive charge and detonate the at least one explosive charge such that a high-energy pressure wave that results from the detonation enlarges the aperture of the feature to open the feature. In embodiments, the at least one explosive charge can include at least one linear shaped charge. Prior to detonating the at least one linear shaped charge, the downhole tool can be positioned in the production well such that the major length dimension of the at least one linear shaped charge is generally orthogonal to the major dimension of the aperture of the feature, and the major length dimension of the at least one linear shaped charge being larger than a minor height dimension of the aperture of the feature.

In embodiments, the perforating can include igniting a propellant such that a combustion wave results from the ignition, wherein the combustion wave removes rock to open the feature. In embodiments, the combustion wave can include a propagating flame front that propagates by transferring heat and mass to an unburned mixture of an oxygen source and fuel vapor ahead of the flame front. In embodiments, the perforating can employ a downhole tool configured to emit a combustion wave that enlarges the aperture of the feature to open the feature.

In embodiments, the intervention(s) can include stimulating at a position in the production well corresponding to the position of the feature in the production well, wherein the stimulating comprises opening the feature.

In embodiments, the stimulating can increase flow area and reduce pressure loss and increase the flow rate of pressurized geothermal fluid carried by the feature into the production well.

In embodiments, the stimulating can be localized with respect to the aperture of the feature by setting inflatable packers at measured depths in the production well above and below the aperture of the feature.

In embodiments, the stimulating can extend about the circumference of the production well.

In embodiments, the stimulating can extend through the aperture of the feature into the near wellbore region of the production well with a limited radial length in the range of 2 to 50 feet into the near wellbore region.

In embodiments, the stimulating can employ a downhole tool disposed at a position in the production well that corresponds to the position of the feature in the production well.

In embodiments, the stimulating can include injecting high-pressure frac fluid into the feature to hydraulically fracture rock and open the feature. In embodiments, the perforating can employ a downhole tool configured to inject high-pressure frac fluid into the feature to hydraulically fracture rock and open the feature.

In embodiments, the stimulating can include injecting frac fluid or water into the feature to generate a network of shear fractures in rock and open the feature. In embodiments, the perforating can employ a downhole tool configured to inject frac fluid or water into the feature to generate a network of shear fractures in rock and open the feature.

In embodiments, the stimulating can include injecting an acid-based treatment fluid into the feature, wherein the treatment fluid dissolves rock to etch or create wormholes that are fluidly connected to the feature and open the feature. In embodiments, the stimulating can employ a downhole tool configured to inject the treatment fluid into the feature.

In embodiments, the stimulating can include mixing exothermic reagents that undergo an exothermic chemical reaction that creates a shock wave, and directing the shock wave into the feature, wherein the shock wave creates submicron pores and/or micro-fractures in rock and opens the feature. In embodiments, the stimulating can employ a downhole tool configured to combine exothermic reagents that undergo an exothermic chemical reaction that creates a shock wave directed into the feature, wherein the shock wave creates submicron pores and/or micro-fractures in rock and opens the feature.

In embodiments, the stimulating can include producing a high-temperature flame, and directing the high-temperature flame into the feature, wherein the high-temperature flame induces thermal stress that breaks rock to form submicron pores and/or micro-fractures and opens the feature. In embodiments, the stimulating can employ a downhole tool configured to produce a high-temperature flame by combustion of a mixture of an oxygen source (e.g., air) and fuel and to direct the high-temperature flame into the feature, wherein the high-temperature flame induces thermal stress that breaks the rock with submicron pores and/or micro-fractures and opens the feature.

In embodiments, the stimulating can include injecting high-velocity low-temperature fluid into the feature, wherein the high-velocity low-temperature fluid rapidly cools rock to break rock and opens the feature. In embodiments, the stimulating can employ a downhole tool configured to emit high-velocity low-temperature fluid into the feature. Contact of the low-temperature fluid on hot rock can create rapid cooling and induces thermoelastic stress alterations that breaks the rock with submicron pores and/or micro-fractures and opens the feature.

In embodiments, the stimulating can include injecting treatment fluid into the feature, wherein the treatment fluid dissolves or breaks apart fracture damage and opens the feature. In embodiments, the stimulating can employ a downhole tool configured to inject treatment fluid into the feature, wherein the treatment fluid chemically reacts with fracture damage and dissolves or breaks apart the fracture damage and opens the feature.

In embodiments, the intervention(s) can include cutting rock or enlarging the feature at an aperture of the feature.

In embodiments, cutting rock can include mechanical cutting or abrasion of rock about the circumference of the production well. In embodiments, cutting rock can employ a downhole tool disposed at a position in the production well that corresponds to the position of the feature in the production well. In embodiments, the downhole can be a rotary mechanical cutting/notching downhole tool that is operated to cut rock by mechanical cutting or abrasion at the aperture of the feature.

In embodiments, cutting rock can include emitting a high-velocity abrasive fluid jet and rotating the abrasive fluid jet to cut rock by abrasion about the circumference of the production well. In embodiments, cutting rock can employ a downhole tool having a rotatable tool body that emits a high-velocity abrasive fluid jet. As the tool body is rotated, the abrasive fluid jet can cut the rock by abrasion at the aperture of the feature.

In embodiments, cutting rock can include detonating an explosive charge to direct shock waves that cut rock about the circumference of the production well. In embodiments, cutting rock can employ a downhole colliding tool that detonates opposite ends of an explosive charge to propagate shock waves that direct energy to cut rock at the aperture of the feature.

In embodiments, cutting rock can include underreaming the production well about the circumference of the production well. In embodiments, cutting rock can employ an underreamer tool that is operated to cut rock at an aperture of the feature.

In embodiments, the intervention(s) can include drilling at least one additional bore that extends from the production well and intersects the feature. The at least one additional bore can increase the contact area between the production well and the geothermal reservoir. Directional drilling can be used to drill the at least one additional bore.

In embodiments, intersection of the at least one additional bore and the feature can be within an offset in the range of 1 foot to 200 feet away from the production well.

In embodiments, the at least one additional bore can have a kickoff point located above the intersection of the feature and the production well. In embodiments, the kickoff point can be located at an offset of 1 foot to 200 feet away from the intersection of the feature and the production well.

In embodiments, the at least one additional bore can include a plurality of bores that connect to the production well at kickoff points that are distributed at varying azimuths about the production well.

In embodiments, the intervention(s) can include a combination of different operations, which can be selected from perforating, stimulation treatment, cutting or enlarging, or additional bore drilling as described herein. For example, the intervention(s) can include acid stimulation combined with perforating and jetting with abrasives and acid. In another example, the intervention(s) can include acid stimulation combined with perforating and jetting with acid.

In embodiments, at least a part of the production well that intersects the feature(s) of the production well can be completed as an open wellbore, with a liner-type completion, with a cased cement completion, or other suitable completion.

BRIEF DESCRIPTION OF THE DRAWINGS

The subject disclosure is further described in the detailed description which follows, in reference to the noted plurality of drawings by way of non-limiting examples of the subject disclosure, in which like reference numerals represent similar parts throughout the several views of the drawings, and wherein.

DETAILED DESCRIPTION

The particulars shown herein are by way of example and for purposes of illustrative discussion of the embodiments of the subject disclosure only and are presented in the cause of providing what is believed to be the most useful and readily understood description of the principles and conceptual aspects of the subject disclosure. In this regard, no attempt is made to show structural details in more detail than is necessary for the fundamental understanding of the subject disclosure, the description taken with the drawings making apparent to those skilled in the art how the several forms of the subject disclosure may be embodied in practice. Furthermore, like reference numbers and designations in the various drawings indicate like elements.

As used herein, the term "near wellbore region" refers to a rock formation within less than 5 feet from a wellbore surface. That is, a production wellbore having a 12-inch diameter includes a near wellbore region with an 11-foot diameter that is centered in the production wellbore.

As used herein, the term "aperture" refers to an opening or space in the near wellbore region that connects a feature to a production well at the intersection of the feature and the production well.

As used herein, the term "opening a feature" means enhancing or increasing flow of geothermal fluid carried by a feature into a production well by enlarging an aperture that connects the feature to the production well or opening new flow channels that are fluidly connected to the feature or unblocking or improving the flow of geothermal fluid through an aperture that connects the feature to the production well.

As used here, the term "near the intersection of the feature" means within less than 30 feet of a center of the intersection of the feature with the production well.

Embodiments of the present disclosure are directed to boosting or improving the performance of geothermal systems that include a geothermal reservoir, which is a volume of subsurface rock that contains a natural source of pressurized geothermal fluid (e.g., hot water or brine). One or more production wells are drilled from the surface into and through the geothermal reservoir and intersect one or more features in the subsurface rock of the geothermal reservoir. These features provide a flow path of the pressurized geothermal fluid into the production well(s) where it flows through the production well(s) to the surface. The thermal energy from the hot fluid that flows to the surface can be extracted and used by an energy conversion plant for power generation, large scale heating or cooling, industrial/agricultural processes, or other geothermal applications.

Figure 1:
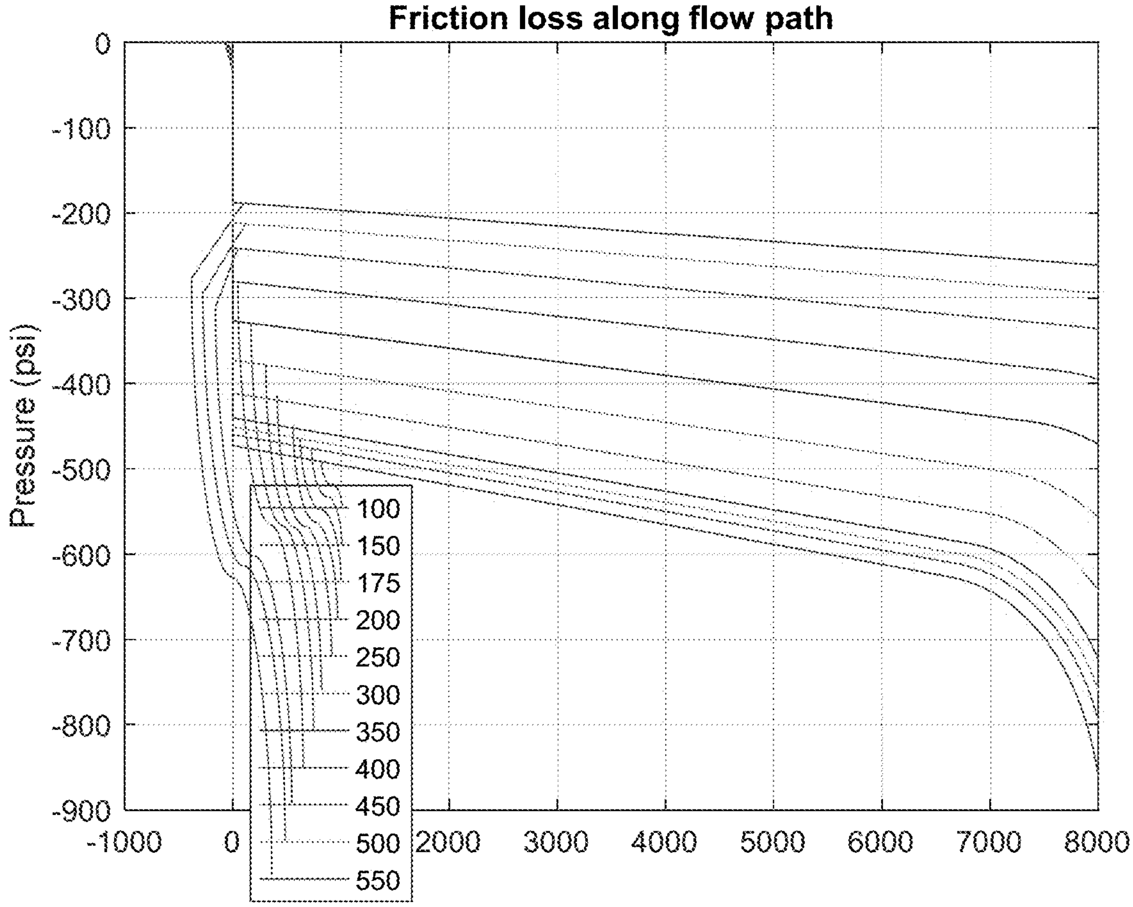
FIG. 1 depicts plots of simulated pressure loss (loss of pressure head) along a flow path that includes a fracture (3 mm in size) extending through a geothermal reservoir and into a production well and then up the production well to the surface. The plots of pressure loss are labeled for varying surface pressure applied at the surface wellhead in the range from 100 to 550 psi.

Flow loss can occur where the feature(s) intersect and fluidly couple to the production well(s) of the system. Specifically, the aperture of a feature at the intersection of the production well can act as a flow restrictor that limits fluid flow through the fracture and into the production well. This can limit the amount of heat captured by the system and delivered to the surface and thus decrease the productivity of the system. These pressure losses are illustrated in FIG. 1, which includes plots of pressure loss (loss of pressure head) along a flow path from a 3 mm feature and up a production well to the surface of a geothermal system. The pressure loss along the flow path is from the far field though the 3 mm fracture that enters the production well (at x=0) and flows to the surface (at x=8000). The plots of pressure loss are labeled for varying surface pressure applied at the surface wellhead in the range from 100 to 550 psi. Thus, greater friction pressure losses (pressure head) are observed with lower surface pressures. The plots of FIG. 1 are derived from simulations, which assume that feature is defined by a flat and parallel disc that surrounds the production well with radial inflow. In this case, the aperture of a feature forms an annular void of a well-defined height (in this case 3 mm) that encircles the production well with the circumference of the annular void corresponding to the wellbore diameter. The flow through the feature is assumed to be laminar flow that transitions to turbulent flow with the transition at the point where the laminar and turbulent friction factors are equal. The far field is assumed to be at a constant pressure source. The actual pressure drop for the laminar flow is minimal. The pressure drop for the turbulent flow is higher as evidenced by the plot. The bigger pressure drop is at the entrance (intersection) of the feature into the production well.

According to one or more embodiments of the present disclosure, one or more downhole tools can be configured to perform one or more interventions that open a feature that intersects the production well or otherwise enhances/increases the flow rate of pressurized geothermal fluid into the production well of the system. This can increase the fluid flow of the geothermal fluid sourced from the geothermal reservoir into the production well, which can increase the amount of heat captured by the system and delivered to the surface and thus increase the productivity of the system.

Figure 2:
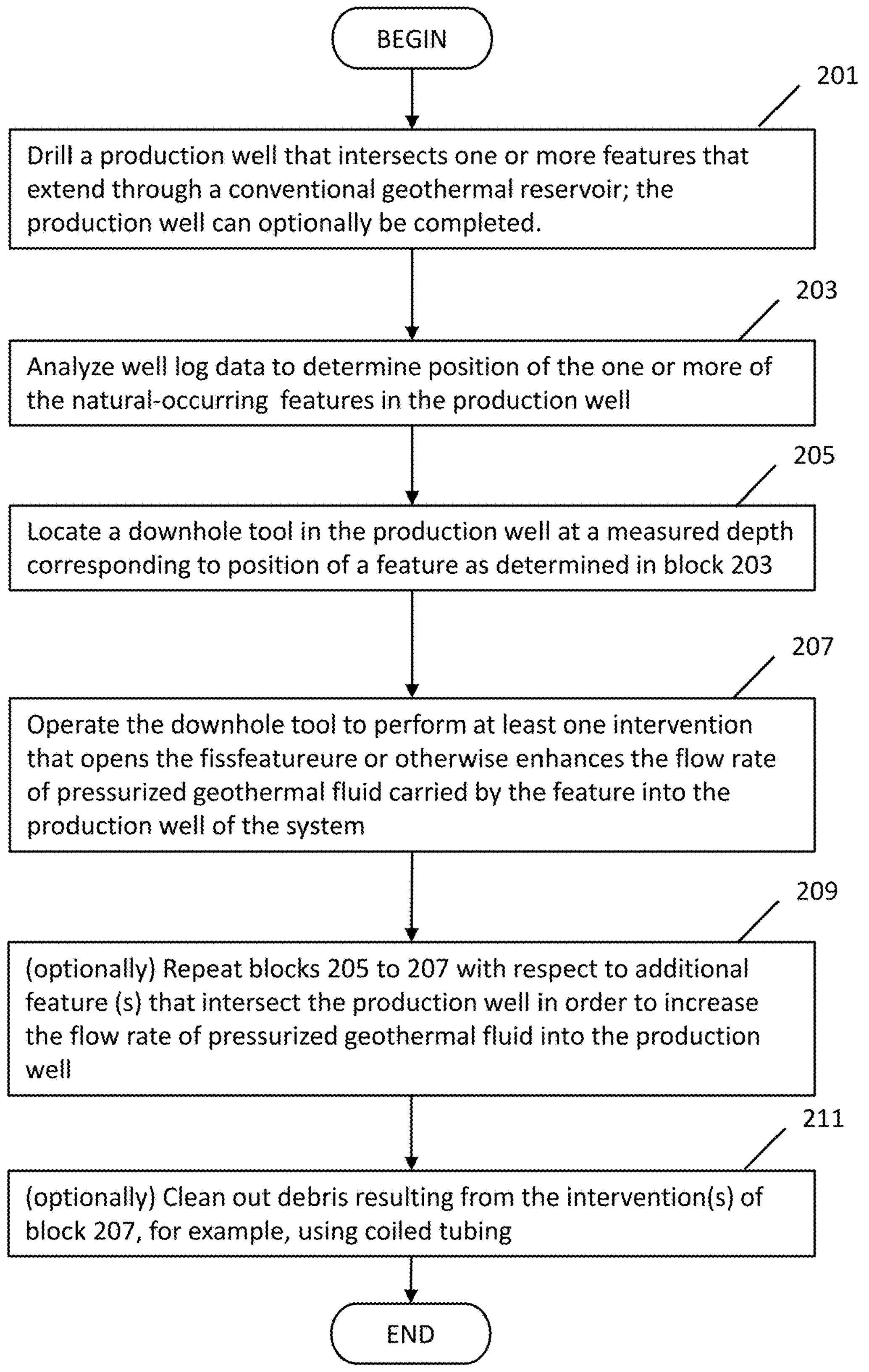
FIG. 2 depicts a flowchart of an example workflow in accordance with present disclosure, which includes an intervention that enlarges or opens a feature that intersects the production well or otherwise increases the flow rate of pressurized geothermal fluid into the production well of the system.

FIG. 2 is a flowchart of an example workflow which includes an intervention that opens a feature that intersects the production well or otherwise enhances or increases the flow rate of pressurized geothermal fluid into the production well of the system.

Figure 3:
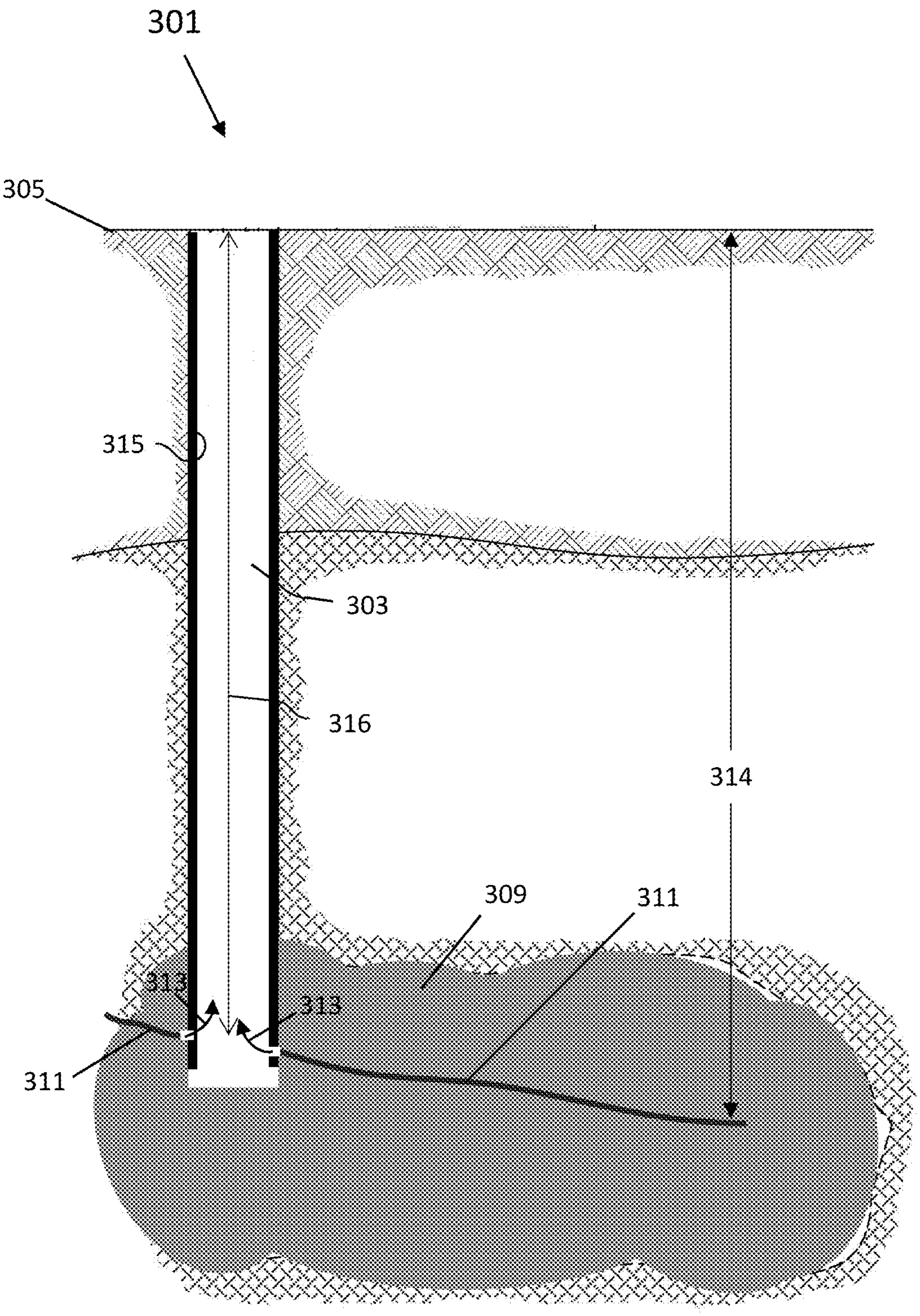
FIG. 3 is a schematic diagram of an exemplary geothermal system having a production well that intersects and connects to a feature extending through a geothermal reservoir.

In block 201, a production well (also commonly referred to as a production wellbore) is drilled such that the production well intersects one or more features of a geothermal reservoir. The one or more features extend through the geothermal reservoir and connect to the production well. The one or more features provide for fluid flow of the pressurized geothermal fluid (e.g., hot water or brine) sourced from the geothermal reservoir into the production well as shown in FIG. 3. Conventional or unconventional drilling methods can be used. In embodiments, the production well can optionally be completed, for example with a perforated casing (e.g., FIG. 4A) or perforated liner (e.g., FIG. 4B) or as an open wellbore (e.g., FIG. 4C) at least in the interval(s) that intersect the one or more features of the geothermal reservoir. As discussed herein, each of a casing and liner may be referred to as a tubular completion component.

In block 203, well log data (e.g., subsurface data) can be analyzed to determine position of the one or more features intersected by the production well of block 201. For example, borehole pressure measurements, caliper measurements, resistivity measurements, acoustic or ultrasonic borehole imaging measurements, and/or other downhole measurements can be analyzed to determine wellbore depth (e.g., position, measured depth) for one more features. These measurements can be performed while-drilling or by a wireline tool after drilling. For example, borehole pressure measurements can be analyzed for pressure loss while drilling. When the drilling crosses a feature, the borehole pressure will decrease. The depth of such pressure loss can be detected and used as the measured depth (e.g., position) of the feature in the production well, which corresponds to wellbore depth of the aperture of the feature in the production well. In some embodiments, the subsurface data may be obtained from direct measurement of the production well, from surface measurements, or from offset wells.

In block 205, a downhole tool can be located in the production well of block 201 at a measured depth corresponding to the position of the feature as determined in block 203. The downhole tool may be located in the production well via drill pipe, coiled tubing, or wireline. Accurately positioning the downhole tool for the intervention at or near the feature increases the effectiveness of the intervention. That is, an intervention performed within less than 3 feet, less than 2 feet, or less than 1 foot of the feature that intersects the production well can greatly improve the effectiveness of the intervention to reduce the pressure loss of the pressurized geothermal fluid and/or to increase the flow rate of the pressurized geothermal fluid into the production well.

Figure 22:
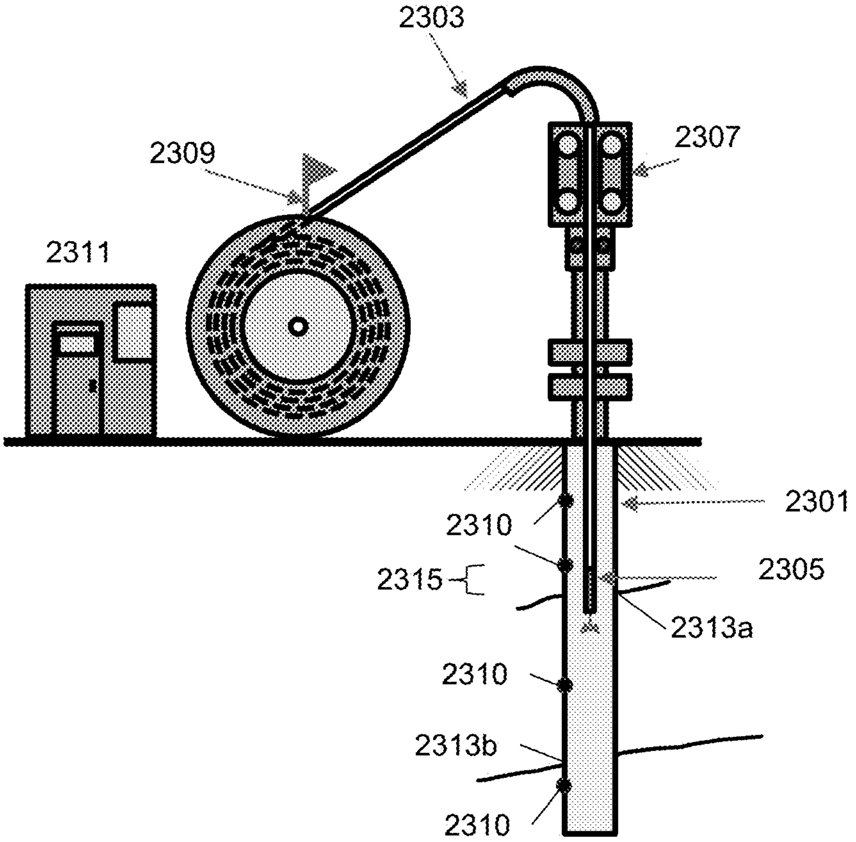
FIG. 22 illustrates an exemplary coiled tubing system utilized to determine the measured depth of reference points within an accuracy tolerance of a feature that intersects the production well.

FIG. 22 illustrates a coiled tubing system that may be utilized to determine the measured depth of a feature that intersects the production well and run a downhole tool for an intervention to the measured depth within an accuracy tolerance. After the formation of a production well 2301, a measurement tool 2305 may be run into the production well 2301 on a conveyance system to identify one or more features 2313 that intersect the production well 2301. In some embodiments, the measurement tool 2305 is coupled to coiled tubing 2303 or a wireline through an injector head 2307. In some embodiments, the measurement tool 2305 is a casing collar locator (CCL) or a gamma ray tool. The CCL may be run on the coiled tubing string 2303 or wireline to detect one or more reference points 2310 (e.g., casing collars, pup joints) within a cased or lined production well. The gamma ray tool may detect the one or more reference points 2310 and/or the features 2313 directly. The measurement tool 230*t* may be configured to communicate with a control system 2311 in real-time via electrical or optical telemetry cables through or along the coiled tubing 2303. Upon detection by the measurement tool 2305 of a reference point 2310 or feature 2313, an arrangement of the coiled tubing 2303 may be flagged 2309, marked physically, marked digitally, or otherwise recorded to correlate the arrangement of coiled tubing 2303 with the reference point 2310 or feature 2313. In some embodiments, a control system 2311 may correlate the one or more flagged 2309 arrangements of the coiled tubing 2303 against other data to determine the measured depths of the reference points 2310 or features 2313. The control system 2311 may determine relative positions between reference points 2310, and the control system 2311 may correlate the reference points 2310 within an accuracy tolerance 2315 of the features 2313. In some embodiments, the control system 2311 may be configured to utilize real-time telemetry and communication with the measurement tool 2305 and other systems to determine the measured depth of a feature and/or a reference point. Upon removal of the measurement tool 2305 from the coiled tubing 2303 and the production well 2301, an intervention tool (e.g., perforating tool, stimulating tool, cutting tool) may be coupled to the coiled tubing 2303. The coiled tubing 2303 may be run into the production well 2301 until a desired flagged 2309 point that correlates with the desired reference point 2310 of the casing or liner, or the desired feature 2313 that intersects the production well. Accordingly, the control system 2311 may run the coiled tubing and intervention tool to within an accuracy tolerance 2315 of the desired feature 2313 to perform an intervention as described in detail below. The accuracy tolerance 2315 may be less than 5 feet, less than 4 feet, less than 3 feet, less than 2 feet, or less than 1 foot.

Returning to FIG. 2, in block 207, the downhole tool can be operated to perform an intervention that opens the feature or otherwise enhances/increases the flow rate of pressurized geothermal fluid into the production well of the system. The intervention is configured to open the feature, which may increase flow area and reduce pressure loss at the aperture of the feature at intersection of the feature and the production well.

In optional block 209, the operations of blocks 205 to 207 can be repeated with respect to additional feature(s) that intersect the production well in order to increase the flow rate of pressurized geothermal fluid into the production well.

In optional block 211, debris resulting from the intervention of block 207 can be cleaned out and removed from the production well, for example, using coiled tubing. This can also increase the flow rate of pressurized geothermal fluid into the production well.

In other embodiments, blocks 205 and 207 can include one or more interventions that include a combination of different operations, which can be selected from perforating, stimulation treatment, cutting or enlarging, or additional bore drilling as described herein. For example, the intervention(s) can include acid stimulation combined with perforating and jetting with abrasives and acid. In another example, the intervention(s) can include acid stimulation combined with perforating and jetting with acid. The intervention(s) can employ corresponding downhole tools as described herein FIG. 3 illustrates an example geothermal system 301 in accordance with the present disclosure, which include a geothermal reservoir 309. The geothermal reservoir 309 is a volume of subsurface rock that contains a natural source of pressurized geothermal fluid (e.g., hot water or brine). A production well 303 is drilled from the surface 305 into and through the geothermal reservoir 309 and intersects a feature 311 in the subsurface rock of the geothermal reservoir 309. The feature 311 provides a flow path of the pressurized geothermal fluid into the production well 303 as depicted by arrows 313, where it flows through the production well 303 to the surface 305. The thermal energy from the geothermal fluid that flows to the surface 305 can be extracted and used by an energy conversion plant for power generation, large scale heating or cooling, industrial/agricultural processes, or other geothermal applications. The feature 311 has a surface depth 314 that is a vertical distance from the surface 305. The feature 311 has a measured depth 316 along the production well 303 that is a length of the production well 303 to the feature. As may be appreciated, the measured depth 316 may be different than the surface depth 316 based at least in part on a pathway of the production well 303. In the embodiment shown, the wellbore of the production well 303 is completed with a perforated casing 315 with perforations in the interval of the production well 303 that intersects the feature 311. In alternate embodiments, the wellbore of the production well 303 can be completed with a perforated liner (e.g., FIG. 4B) or as an open wellbore (e.g., FIG. 4C) at least in the interval of the production well 303 that intersects the feature 311.

In embodiments, a downhole tool can be deployed in the production well 303 and operated to perform one or more interventions that open the feature 311 or otherwise enhance/increase the flow rate of pressurized geothermal fluid into the production well 303 of the system. In the case that the intervention enlarges the aperture of the fracture 311 at the intersection of the fracture 311 and the production well 303, this can increase flow area and reduce pressure loss at the aperture, which can enhance/increase the flow rate of pressurized geothermal fluid into the production well 303 of the system.

Figure 4A:
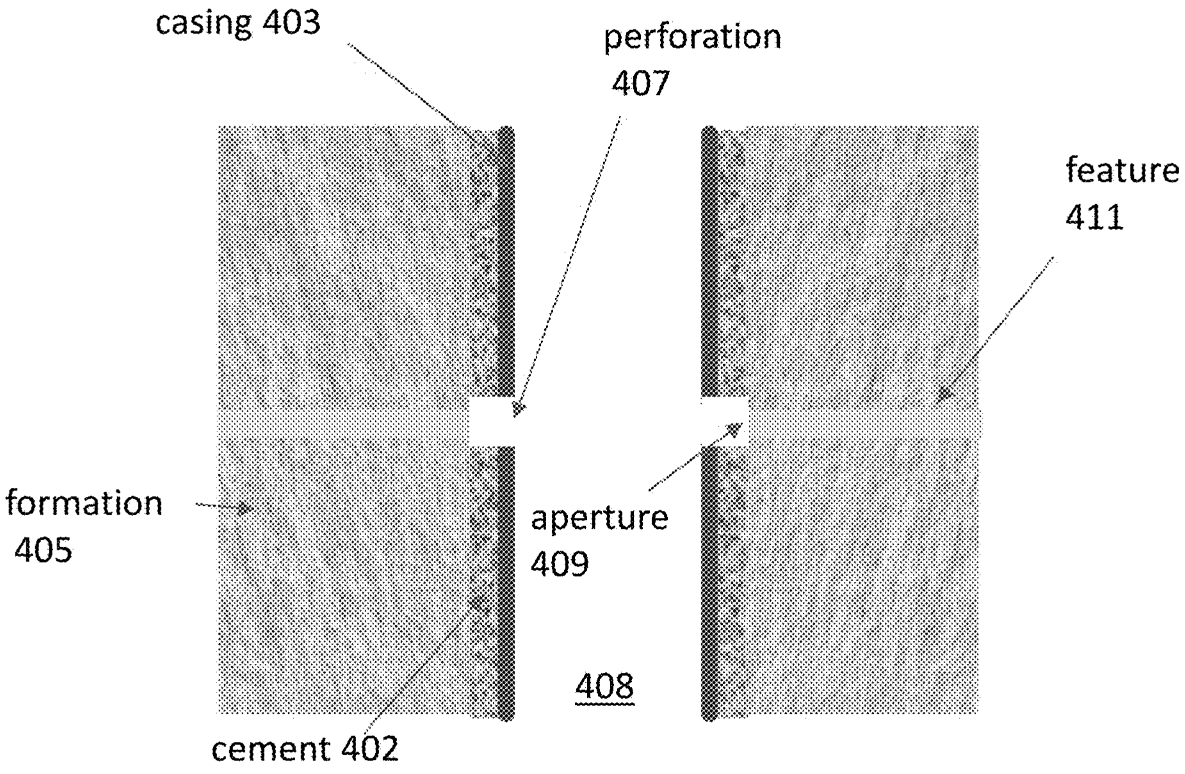
FIG. 4A is a schematic diagram of an exemplary production well that is completed with a cased cement completion; the cased cement completion is perforated to define one or more perforations that expose the formation at or near the intersection of a feature of a geothermal reservoir and the production well.

FIG. 4A is a schematic illustration of a production well 408 (e.g., well 303 of FIG. 3) that is completed with a cased cement completion that includes cement 402 disposed between casing 403 and the formation 405. The cased cement completion is perforated to define one or more perforations (one shown as 407) that expose the formation 405 at or near aperture 409 of the feature 411 of a geothermal reservoir at the intersection of the feature 411 and the production well 408.

Figure 4B:
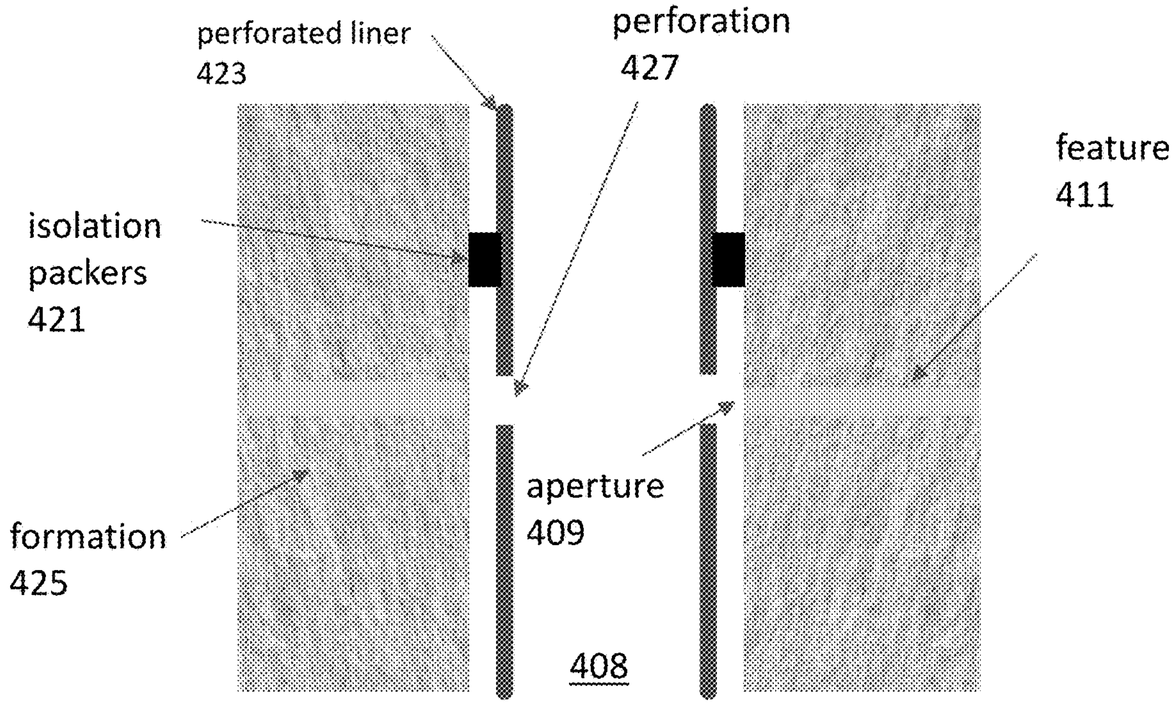
FIG. 4B is a schematic diagram of an exemplary production well that is completed with a liner completion; the liner completion is perforated to define one or more perforations that expose the formation at or near the intersection of a feature of a geothermal reservoir and the production well.

FIG. 4B is a schematic illustration of a production well 408 (e.g., well 303 of FIG. 3) completed with a liner completion that includes one or more isolation packers 421 disposed between a perforated liner 423 and the formation 405. The perforated liner 423 is perforated to define one or more perforations (one shown as 427) that expose the formation 405 at or near aperture 409 of the feature 411 of a geothermal reservoir at the intersection of the feature 411 and the production well 408. In some embodiments, one or more isolation packers 421 are disposed at positions below the aperture 409 of the feature 411. Moreover, one or more isolation packers 421 may be disposed both above and below the aperture 409 of the feature 411, thereby facilitating isolation of the feature 411 from other regions of the formation 425.

Figure 4C:
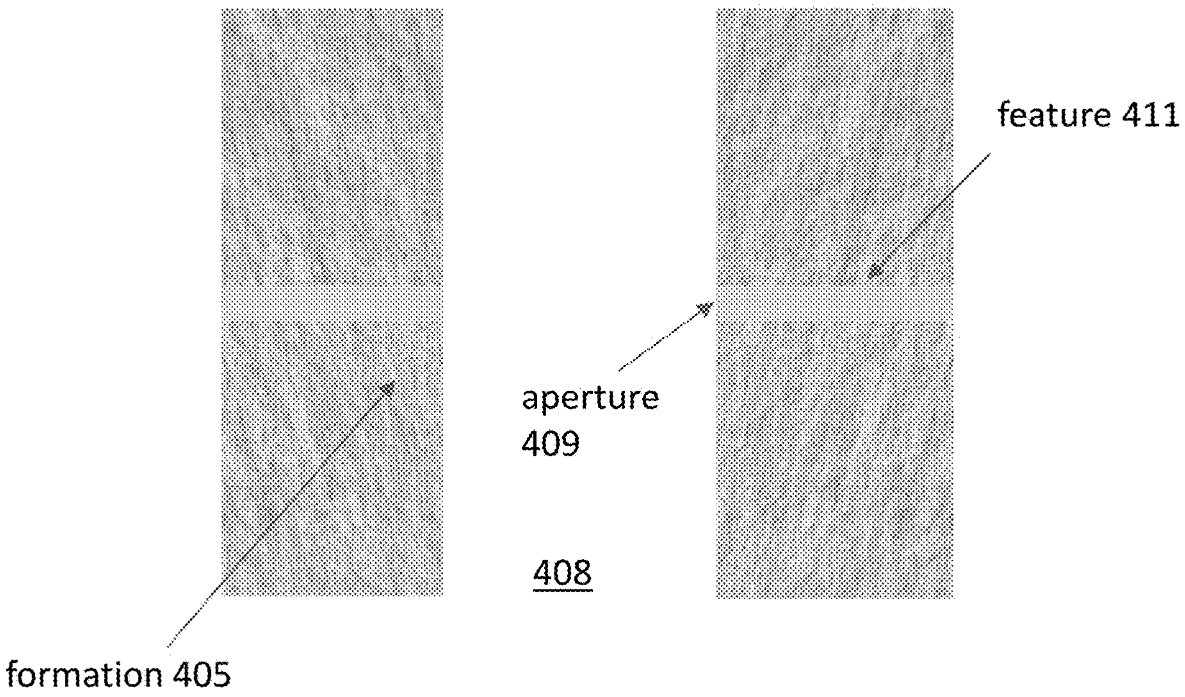
FIG. 4C is a schematic diagram of an exemplary production well completed as an open wellbore in the interval of the production well that intersects the feature of a geothermal reservoir.

FIG. 4C is a schematic illustration of a production well 408 (e.g., well 303 of FIG. 3) completed as an open wellbore in the interval of the production well that intersects the feature 411 of a geothermal reservoir. The open wellbore completion exposes the formation 405 at or near aperture 409 of the feature 411 of a geothermal reservoir at the intersection of the feature 411 and the production well 408.

Intervention Involving Perforating

In embodiments, the intervention of block 207 can include perforating to open a feature. The perforating can employ a downhole tool that focuses and/or directs energy toward an aperture of a feature with sufficient energy that opens the feature. The perforating energy may break apart, abrade, or remove the affected rock at or near the feature. In some embodiments, the perforating energy from the downhole tool is configured to enlarge the feature. The perforating can increase flow area and reduce pressure loss at the aperture. The perforating can increase the flow rate of pressurized geothermal fluid carried by the feature into the production well. The extent of the perforating (i.e., the radial length of the resulting perforations in the radial direction into the near wellbore region and away from the production well) can be limited by the design and operation of the downhole tool and the perforating process itself. In embodiments, the extent of the perforating (i.e., the radial length of the resulting perforations in the radial direction into the near wellbore region and away from the production well) can extend radially less than 5 feet (and possibly less than 2 to 3 feet) into the near wellbore region at the aperture of the feature.

In embodiments, the downhole tool used for the perforating can be configured to direct a high-energy flow toward the formation to open the aperture of the feature. The high-energy flow may be an abrasive fluid or an ignited propellant directed toward the wall of the production well. In some embodiments, the ignited propellant is ammonium perchlorate and aluminum. In some embodiments, the high-energy flow is an explosive detonation directed toward the wall of the production well. For example, the downhole tool may be configured to detonate one or more explosive charges toward the wall of the production well. In some embodiments, the one or more explosive charges may be a shaped explosive charge. In some embodiments, the high-energy flow is a high-energy pulse directed toward the wall of the production well. The high-energy pulse may be a laser or electrical pulse configured to open the feature.

Figure 5:
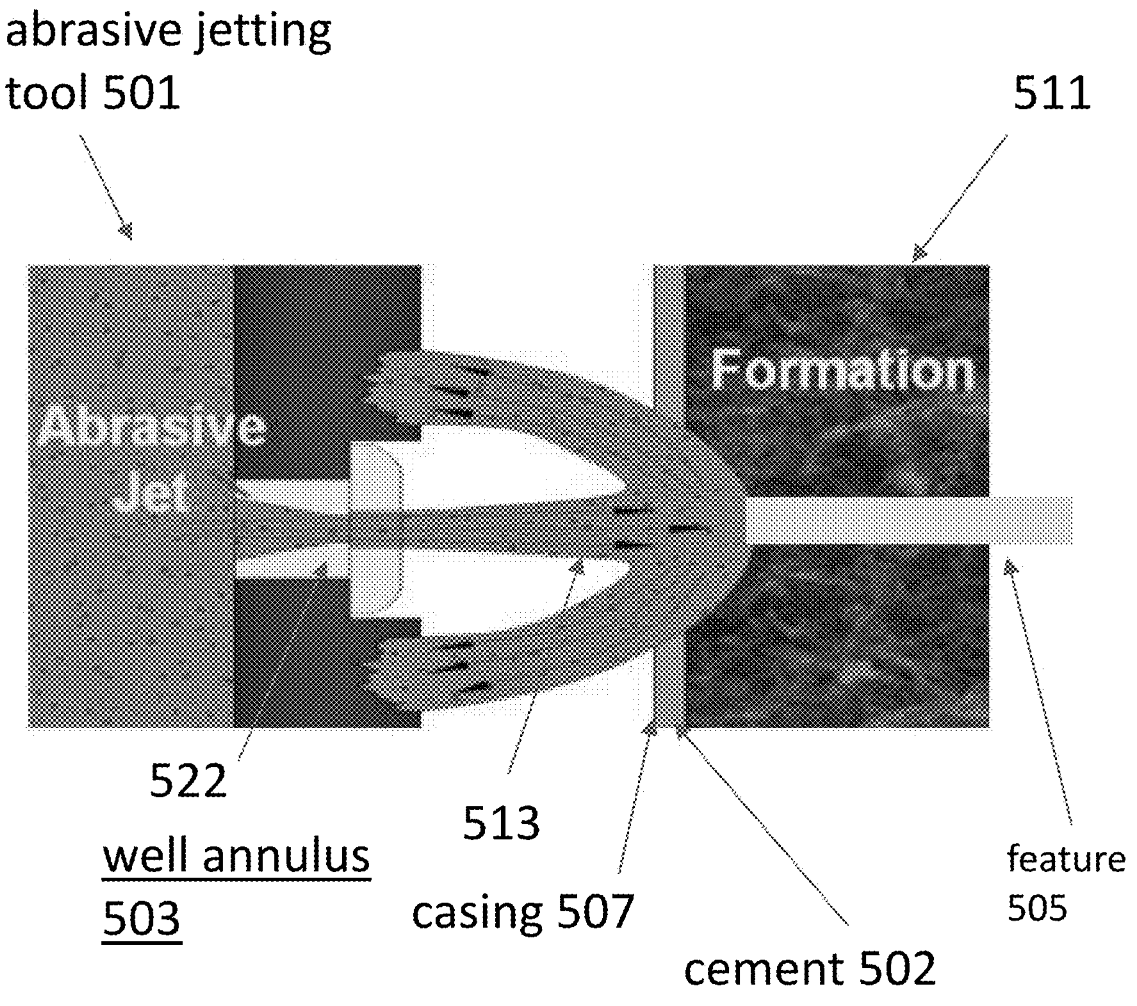
FIG. 5 is a schematic diagram of an exemplary abrasive jetting downhole tool deployed in the annulus of a production well at or near the intersection of a feature of a geothermal reservoir.

In embodiments, the perforating can include abrasive jetting as shown in FIG. 5. In this embodiment, an abrasive jetting downhole tool 501 is conveyed in the production well (for example, by coiled tubing or drill pipe or wireline conveyance) and positioned in the annulus 503 of the production well at a measured depth corresponding to the position of a feature 505 in the production well. In this example, the production well is completed with casing 507 that is cemented to the formation 511 at least in the interval where the feature 505 intersects the production well. The abrasive jetting downhole tool 501 is then configured to emit a high-velocity fluid 513 (e.g., fluid at velocity greater than 100 m/s) with abrasive particles that impacts rock at or near the aperture of the feature 505. The impact of the high-velocity fluid (with abrasive particles) 513 on the rock of the formation 511 removes rock, which enlarges the aperture and opens the feature 505. The treatment fluid can be pumped at high-pressure to the abrasive jetting downhole tool 501, which can be equipped with one more nozzles 522 that direct a jet or jets of fluid onto the target area as shown. In some embodiments, the one or more nozzles 522 may be configured to increase the velocity of the fluid with abrasive particles 513 to open the feature. For the case where the feature 505 intersects the annulus 503 of the production well about the circumference of the production well, the abrasive jetting downhole tool 501 can use controlled rotary motion to direct a jet or jets of the high-velocity fluid about the circumference of the production well. That is, the downhole tool 501 may rotate within the annulus 503 itself or a portion of the downhole tool 501 with the one or more nozzles 522 may rotate within the annulus 503. In some embodiments, the downhole tool 501 is rotated from the surface. The abrasive jetting downhole tool 501 can be used to cut through completion or wellbore components, such as casing 507, liners, and cement 502, to provide access to the formation 511 at or near the aperture of the feature 505. The failure mode of the rock can be spallation if the velocity and/or energy of the fluid jet that impacts the rock is sufficient. In embodiments, the abrasive jetting can be combined with one or more other interventions. For example, jet quench spallation as described herein can be performed at the same time as the abrasive jetting or after the abrasive jetting. In embodiments, the extent of the abrasive jetting (i.e., the radial length of the resulting perforations in the radial direction into the near wellbore region and away from the production well) can extend radially less than 2 feet into the near wellbore region at the aperture of the feature.

Figure 6:
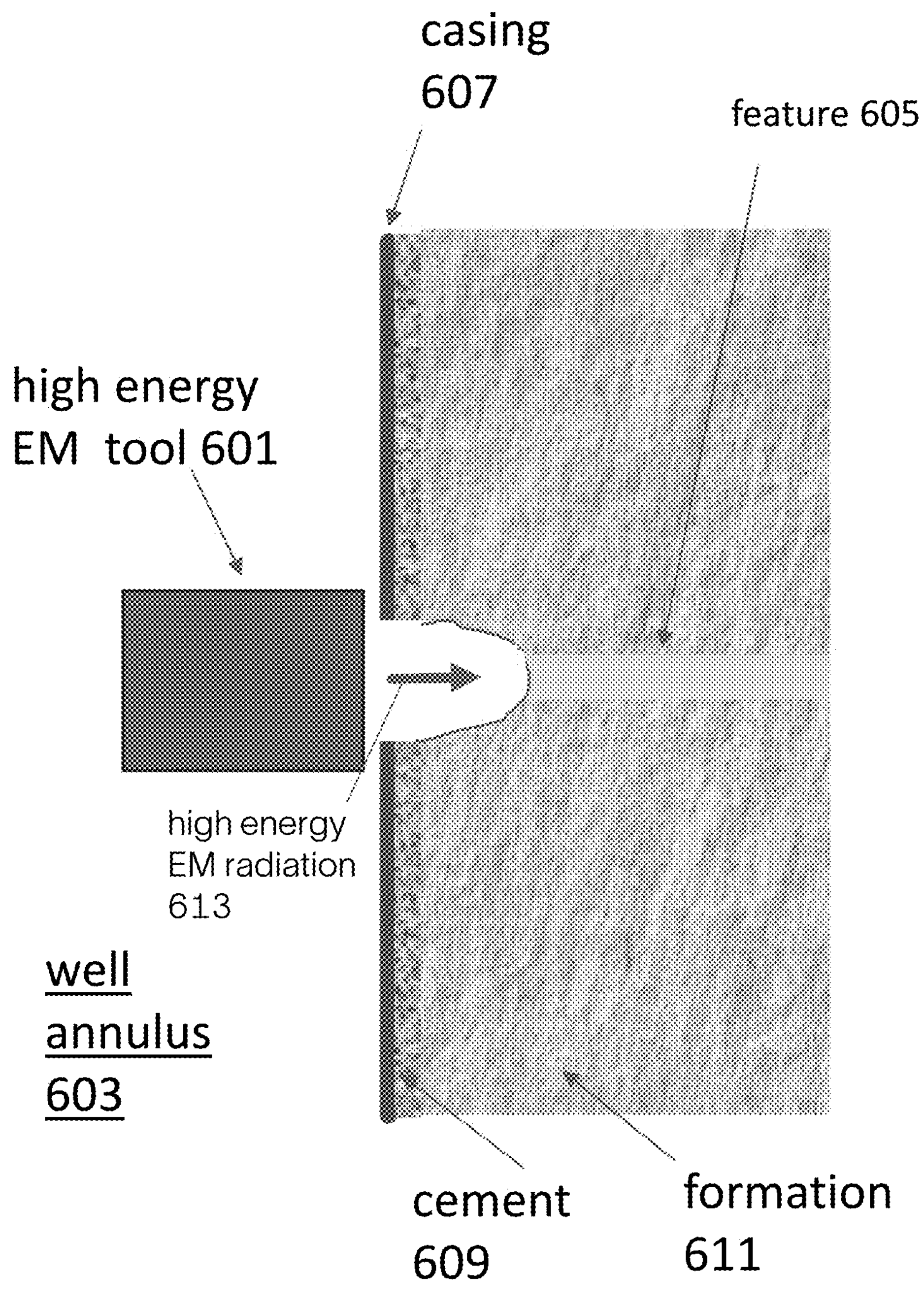
FIG. 6 is a schematic diagram of an exemplary high-energy electromagnetic (EM) downhole tool deployed in the annulus of a production well at or near the intersection of a feature of a geothermal reservoir.

In other embodiments, the perforating can focus and/or direct electromagnetic radiation at or near the aperture of the feature 605 to open the feature as shown in FIG. 6. In this embodiment, a high-energy EM tool 601 is conveyed in the production well (for example, by coiled tubing, drill pipe, wireline conveyance), and positioned in the annulus 603 of the production well at a measured depth corresponding to the position of a feature 605 in the production well. In this example, the production well is completed with casing 607 that is cemented by cement 609 to the formation 611 at least in the interval where the feature 605 intersects the production well. The high-energy EM tool 601 is then configured to emit and direct electromagnetic radiation 613 toward the formation 611 at or near the aperture of the feature 605. The electromagnetic radiation 613 is configured to remove rock at or near the feature 605, which enlarges the aperture and opens feature 605. For the case where the feature 605 intersects the annulus 603 of the production well about the circumference of the production well, the high-energy EM tool 601 can use controlled rotary motion to direct the electromagnetic radiation 613 about the circumference of the production well. That is, the high-energy EM tool 601 may rotate within the annulus 603 itself or a portion of the high-energy EM tool 601 that emits the electromagnetic radiation 613 may rotate within the annulus 503. In some embodiments, the high-energy EM tool 601 is rotated from the surface. The high-energy EM tool 601 can be used to cut through completion or wellbore components, such as casing and cement 607, 609 or liners, to provide access to the aperture of the feature 605 at the intersection of the feature 605 and the production well.

Figures 7A, 7B, 7C, 7D:
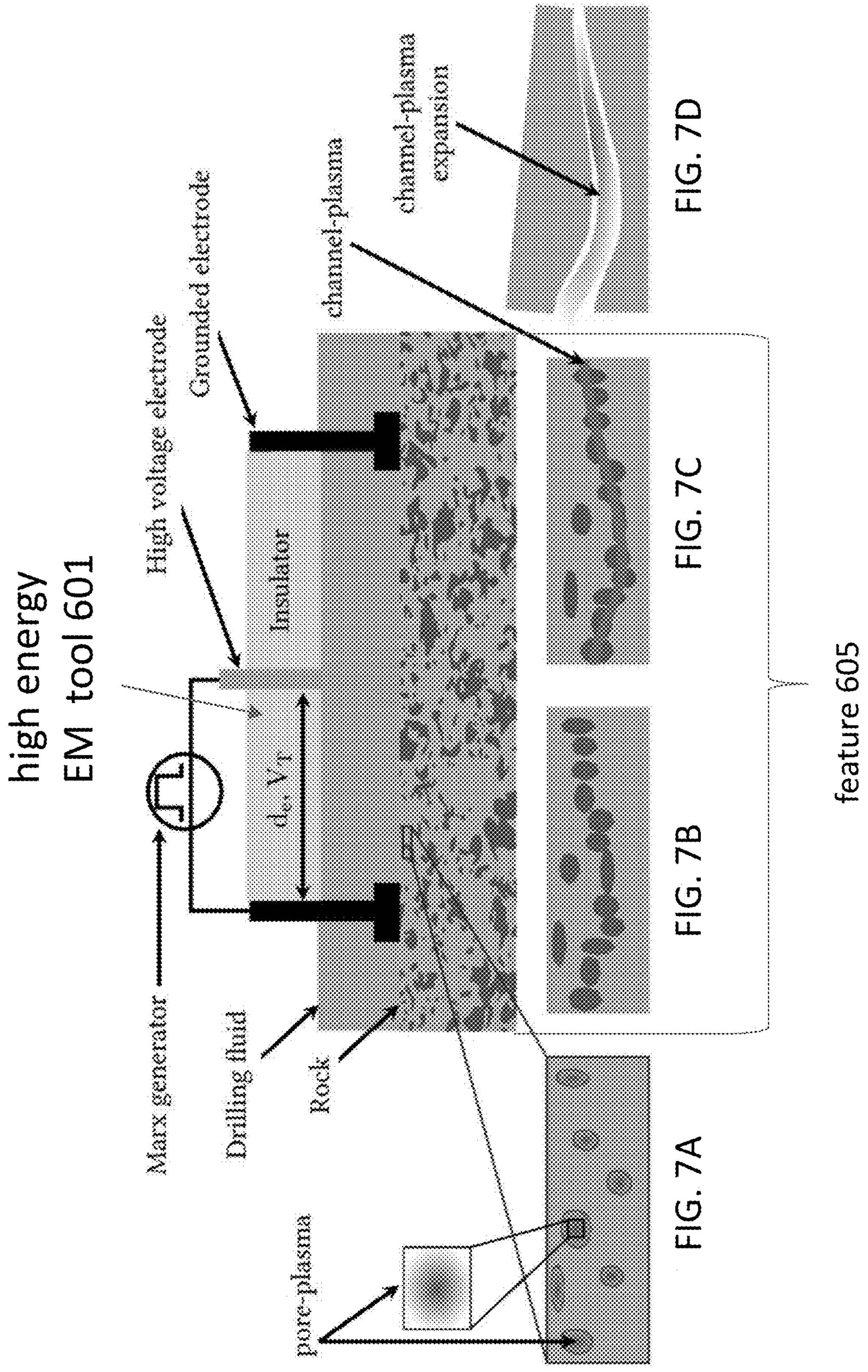
FIG. 7A to 7D includes a schematic diagram of an exemplary plasma pulsing downhole tool that can be deployed in the annulus of a production well at or near the intersection of a feature of a geothermal reservoir, and schematic representations of the physical transformation of rock over time that is caused by the shock waves emitted from the plasma pulsing downhole tool in accordance with the present disclosure.

In embodiments, the high-energy EM tool 601 can be a plasma pulsing tool that uses electrodes in contact with rock at or near the aperture of the feature 605. The electrodes are configured to apply high-voltage impulses (e.g., impulses greater than 100 kV, 150 kV, or 200 kV) with short rise times (e.g., rise times less than 500 nanoseconds) to the rock without mechanical abrasion by the downhole tool. The applied high-voltage impulses create shock waves that break apart and remove the rock and enlarge the aperture and open the feature. The electric impulses transmitted to the formation induce electric discharges within the rock, thereby forming plasma. In some embodiments, drilling fluid between the high-energy EM tool 601 and the formation may facilitate application of the high-voltage impulses to the aperture of the feature 605. An example plasma pulsing tool is illustrated in FIGS. 7A to 7D, which the shows the physical transformation of the rock over time that is caused by the shock waves emitted from the plasma pulsing tool. The electrical impulses from the high-energy EM tool 601 may generate plasma within pores of the formation as shown in FIG. 7A. Gas and/or fluid within pores of the formation may become electrically charged or heated by the electrical pulses to generate the plasma. The temperature and/or pressure of the generated plasma may enlarge the pores and/or fracture the formation around the pores through increasing the tensile stresses on the formation, as shown in FIG. 7B. Subsequent applications of the electrical impulses by the high-energy EM tool 601 to the formation may cause the enlarged pores to interact with each other as shown in FIG. 7C, such that plasma is generated across multiple pores. Sufficient plasma generation within pores may break apart the formation, such as by channel-plasma expansion shown in FIG. 7D. In embodiments, the extent of the plasma pulsing (i.e., the radial length of the resulting perforations in the radial direction into the formation away from the production well) can extend radially less than 3 feet into the near wellbore region of the formation at the aperture of the feature.

Figure 8D:
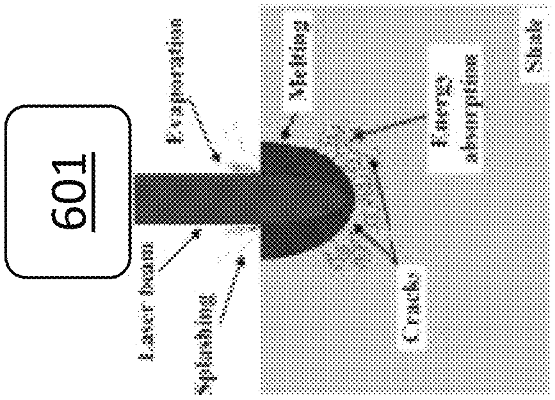
FIG. 8A to 8D includes schematic diagrams of a laser emitted from an exemplary laser downhole tool that can be deployed in the annulus of a production well at or near the intersection of a feature of a geothermal reservoir; the schematic diagrams depict the physical transformation of rock over time that is caused by the laser beam emitted from the laser downhole tool in accordance with the present disclosure.
Figure 8C:
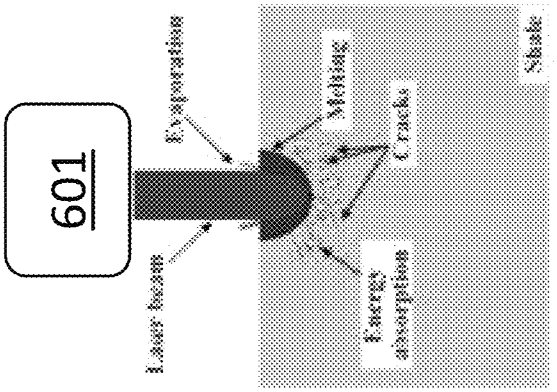
Figure 8B:
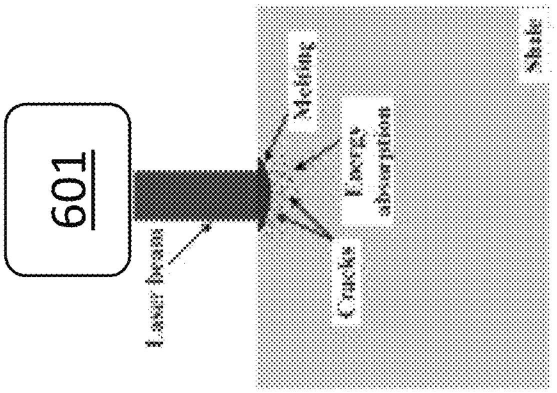
Figure 8A:
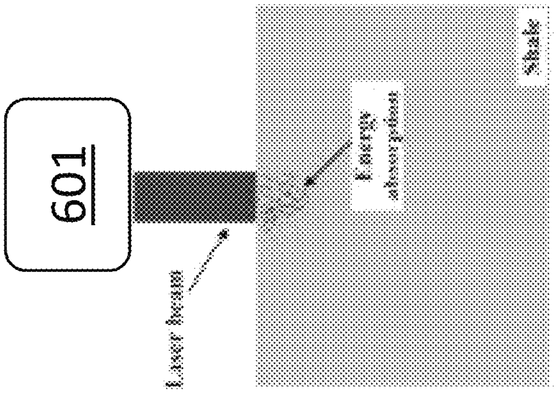

In other embodiments, the high-energy EM tool can be a laser tool that emits a high-power laser (e.g., laser at power in the range of 10 kW to 30 kW with a wavelength lower than 800 nanometers) towards the rock of the formation at or near the aperture of the feature, which breaks part and removes the rock and enlarges the aperture and opens the feature. An example laser tool 601 is illustrated in FIGS. 8A to 8D, which the shows a cycle of energy absorption of the formation from the laser beam that is configured to physically transform the rock over time through continued and/or repeated application of the laser beam. In some embodiments, the laser beam may be directed through the high-energy EM tool through one or more high-power fibers. For example, the formation absorbs energy from the laser beam as shown in FIG. 8A, thereby heating formation. The heating may form cracks in the formation, such as by heating of fluid or gas within pores or thermal expansion of the formation. Continued heating through the application of the laser beam may cause melting at the surface of the formation, as shown in FIG. 8B. Further heating to the melted formation may cause evaporation of the formation as shown in FIG. 8C. Evaporation, convection, splashing, and/or ablation of the melted formation may expose additional regions of the formation to the laser beam, as shown by the penetration of the laser beam in FIG. 8C. The continued application of the laser beam to the formation may progressively heat more of the formation, thereby forming more cracks and melting more of the formation, as shown in FIG. 8D. in this manner, the high-energy EM tool directed to the formation at or near the aperture of the feature may open the feature, thereby enabling an increase in flow area and reduced pressure loss at the aperture. Thus, the high-energy EM tool may increase the flow rate of pressurized geothermal fluid into the production well of the system. In embodiments, the extent of the laser beam (i.e., the radial length of the resulting perforations in the radial direction into the near wellbore region and away from the production well) can extend radially less than 2 feet into the near wellbore region at or near the aperture of the feature.

In still other embodiments, the perforating can include detonating one or more explosive charges (e.g., linear shaped charges) at or near the aperture of the feature to breaks apart the rock and opens the feature. The one or more explosive charges are configured to direct a high-energy pressure wave from the detonation. The high-energy pressure wave thereby impacts rock to open the feature. The result can be similar to that shown in FIG. 6. Additionally, the high-energy pressure wave directed to the feature may generate cracks into the formation from the feature. In some embodiments, the detonation of the explosive charge can be used cut through completion or wellbore components (e.g., casing, liners, and cement) to provide access at or near the aperture of the feature. In embodiments, the effect of the explosive charge detonation (i.e., the radial length of the resulting perforations in the radial direction into the near wellbore region and away from the production well) can extend radially less than 1 foot into the near wellbore region at the aperture of the feature.

Figure 9A:
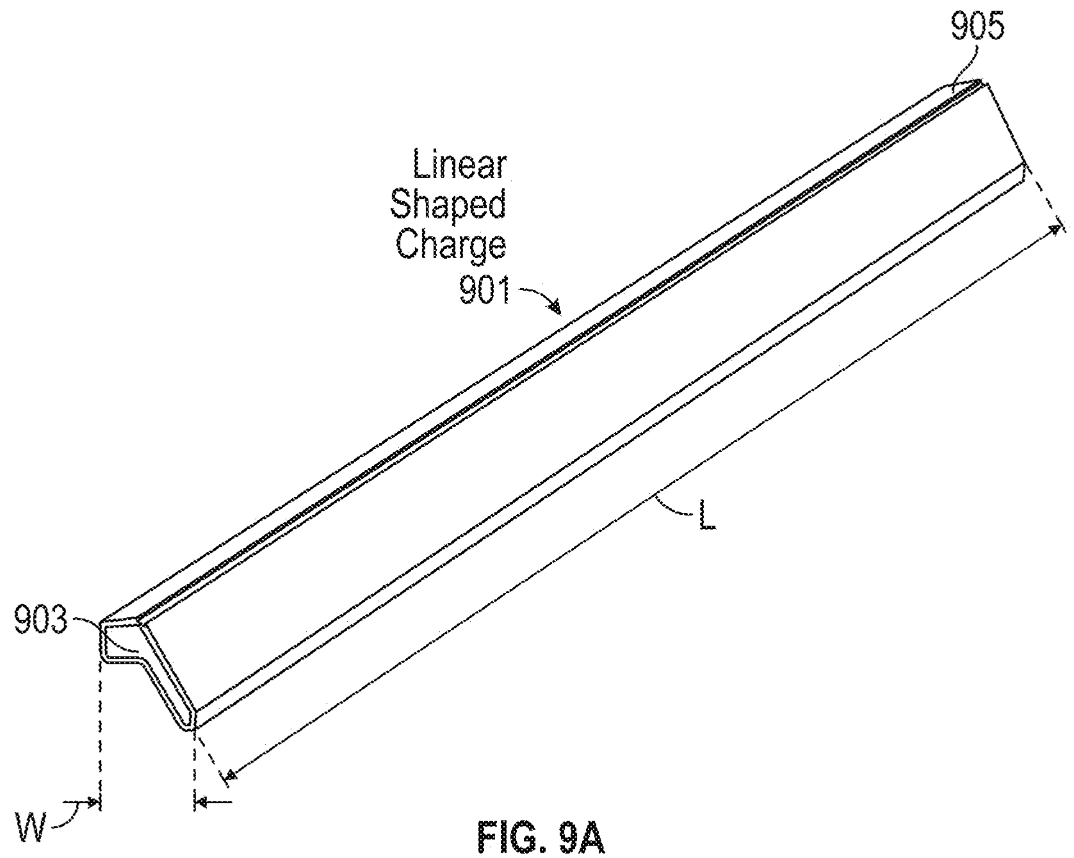
FIG. 9A depicts an exemplary linear shaped charge in accordance with the present disclosure.

As shown in FIG. 9A, a linear shaped charge 901 is a continuous core of explosive material 903 enclosed in an elongate narrow seamless metal sheath housing 905. The charge 901 can be shaped in the form of an inverted "V" having a larger length (labeled "L") relative to a smaller width (labeled "W"), which allows the continuous metal sheath liner and encased explosive to produce a uniform linear cutting action upon detonation The linear shape charge(s) 901 can be positioned and oriented at a wellbore depth such that the penetration pattern of the linear shaped charge(s) that results from the detonation impacts rock at or near the aperture of a feature and enlarges the aperture in this target area to open the feature.

In embodiments, the shape of the aperture of the feature at the wellbore wall can be generalized as conforming to the shape of a flattened disc that surrounds the wellbore wall with a minor height dimension. In this configuration, the linear shaped charge 901 can be configured such that the major length dimension (L) of the linear shaped charge 901 is larger than the minor height dimension of the aperture of the feature. The linear shaped charge 901 can be positioned and oriented such that the major length dimension (L) of the linear shaped charge 901 extends in a direction generally orthogonal or across the minor height dimension of the aperture of the feature. In this configuration, the constraints on aligning the position of the linear shaped charge 901 with the aperture of the feature can be relaxed. This can reduce complexity and possibly errors in such alignment while permitting the detonation of the linear shaped charge(s) to provide a penetration pattern that impacts the rock at or near the aperture of the feature and enlarges the aperture in this target area and opens the feature.

Figure 9B:
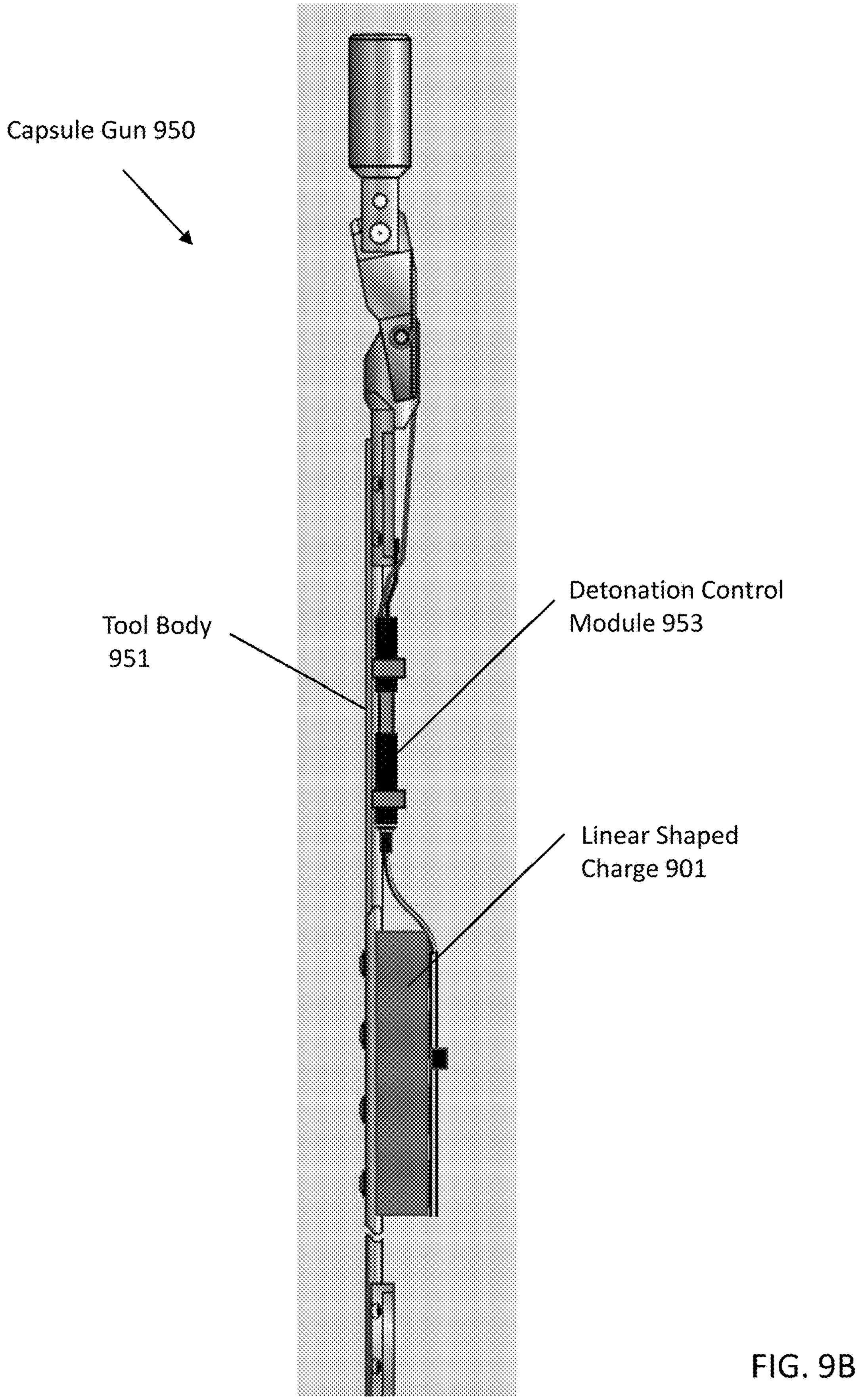
FIG. 9B depicts an exemplary downhole tool (e.g., labeled "capsule gun") that supports one or more linear shaped charges for deployment in a production well for controlled detonation of the linear shaped charge(s) in the production well at or near the intersection of a feature of a geothermal reservoir in accordance with the present disclosure.

FIG. 9B illustrates a downhole tool (e.g., labeled "capsule gun") 950 that can be used for perforating as described herein. Specifically, the capsule gun 950 includes a tool body 951 that can be conveyed in the production well by coiled tubing, wireline cable or other conveyance means. The tool body 951 supports a detonation control module 953 and one or more linear shaped charges (one shown as 901). The detonation control module 953 is operably coupled to the linear shaped charge(s) 901 and can be remotely controlled from the surface to activate the detonation of the linear shaped charge(s) 901. The position (e.g., wellbore depth) of the capsule gun 950 can be set such that the linear shape charge(s) 901 is (are) positioned in the production well at a desired measured depth such that the penetration pattern of the linear shaped charge(s) 901 that results from detonation impacts the rock at or near the aperture of a feature as described herein. In some applications, the production well can be substantially vertical, and the feature close to horizontal. In this case, the linear shape charge(s) 901 can be aligned parallel to the central axis of the tool body 951 such that the slot-like penetration pattern of the linear shaped charge(s) that results from detonation impacts the rock and extends perpendicular to the aperture of the feature with the production well. For cases where the feature intersects the production well about the circumference of the production well, the capsule gun 950 can be controlled to detonate linear shape charges with penetration patterns directed to different target areas spaced about the circumference of the production well. In other embodiments, a perforating gun can be substituted for the capsule gun and deployed in the production well and used to detonate explosive charges for the perforating as described herein. The result can be similar to that shown in FIG. 6.

In still other embodiments, the perforating can include deflagration. In this embodiment, a deflagration downhole tool can be conveyed in the production well and positioned in the annulus of the production well at a measured depth corresponding to the position of a feature in the production well. The deflagration downhole tool is then configured to emit a combustion wave that impacts rock at or near the aperture of a feature. The impact of the combustion wave on the rock removes rock, which enlarges the aperture and opens the feature. The combustion wave is generated by igniting a lower-energy propellant (such as a composite of ammonium perchlorate and aluminum, a thermite compound) that produces a propagating flame front. The flame front propagates by transferring heat and mass to an unburned mixture of an oxygen source and vapor ahead of the flame front. The result on the formation can be similar to that shown in FIG. 6. An example deflagration downhole tool is described in U.S. Pat. No. 8,685,187. For cases where the feature intersects the production well about the circumference of the production well, the deflagration downhole tool can be controlled to emit combustion waves directed to different target areas spaced about the circumference of the production well. The deflagration can be used cut through completion or wellbore components, such as casing and cement or liners, to provide access at or near the aperture of the feature. In embodiments, the extent of the deflagration (i.e., the radial length of the resulting perforations in the radial direction into the formation and away from the production well) can extend radially less than 20 feet into the formation at the aperture of the feature.

While the interventions involving perforating are discussed separately above and illustrated in separate drawings, it is understood that one or more perforating actions described above may be performed at or near a feature that intersects the production well. That is, a shaped charge may be utilized to perforate the casing and cement at or near a first aperture of a feature that intersects the production well, and an abrasive jetting tool may be utilized to further perforate the feature. Moreover, the perforating action performed for a first feature that intersects a production well may be different than a perforating action performed for a second feature that intersects the production well. For example, an abrasive jetting tool may perforate the production well at or near a first feature, and a high-energy EM tool may perforate the production well at or near a second feature.

Intervention Involving Stimulation

In embodiments, the intervention of block 207 can involve stimulating to open a feature. The stimulating can increase flow area and reduce pressure loss at the aperture of a feature with the production well. The stimulating can increase the flow rate of pressurized geothermal fluid carried by the feature into the production well. The stimulating can be localized with respect to the aperture of the feature by setting inflatable packers (straddle packers) at measured depths above and below the aperture of the feature. The stimulating can extend about the circumference of the production well, for example, in the case where the feature intersects the production well about the circumference of the production well. The extent of the stimulating (i.e., radial length 1024 of the stimulating in the radial direction into the formation away from the production well) can be limited by the design and operation of the downhole tool and the stimulation treatment itself. In embodiments, the extent of the stimulating (i.e., radial length 1024 of the stimulating in the radial direction into the formation away from the production well) can extend radially in range of 1 foot to 50 feet into the formation at or near the aperture of the feature.

Figure 10:
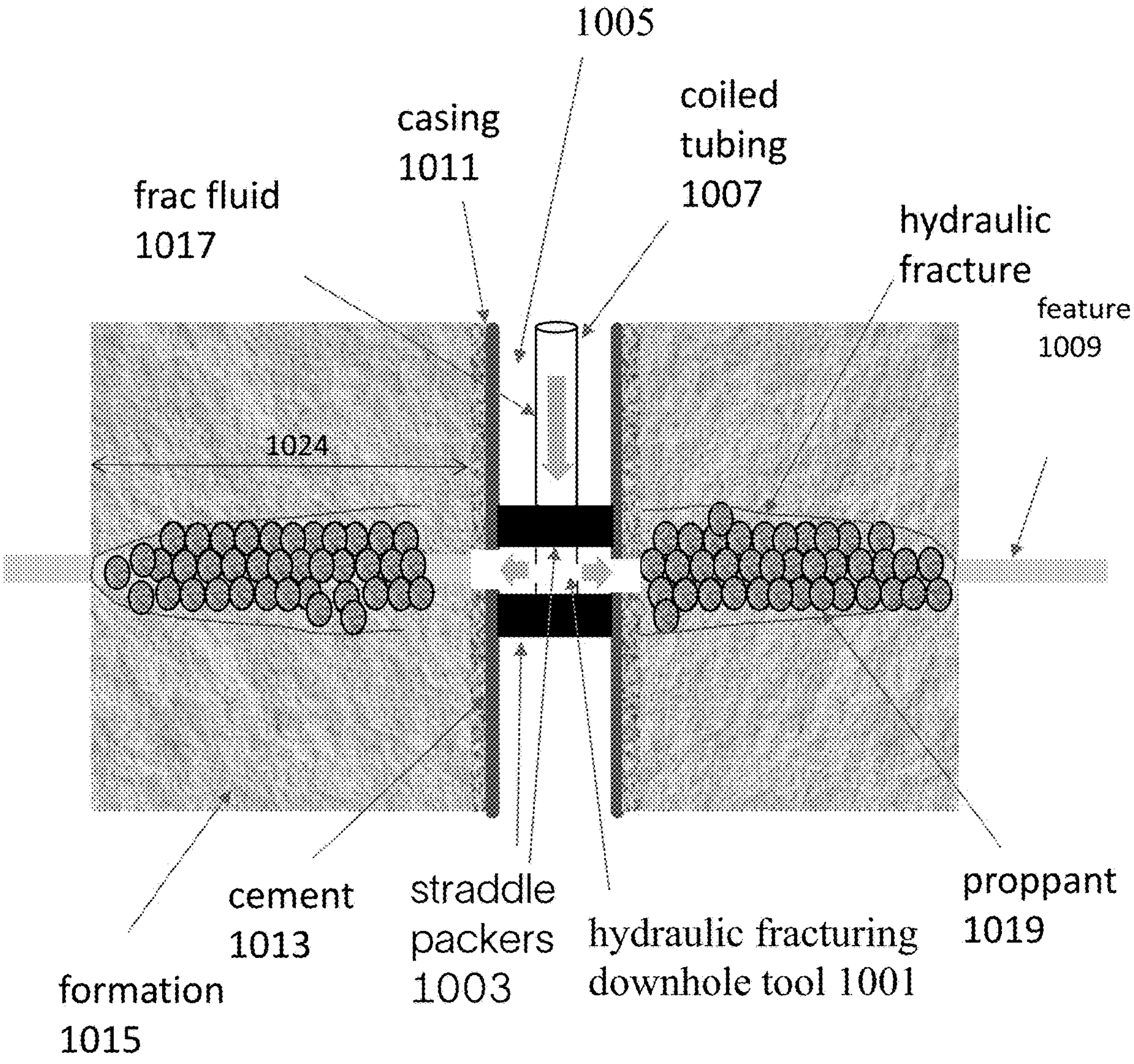
FIG. 10 is a schematic diagram of an exemplary hydraulic fracturing downhole tool deployed in the annulus of a production well at or near the intersection of a feature of a geothermal reservoir, and a hydraulic fracture created by operation of the tool that opens and enlarges the feature at the intersection of the feature and the production well in accordance with the present disclosure.

In embodiments, the stimulating can include hydraulic fracturing as shown in FIG. 10. A hydraulic fracturing downhole tool 1001 having a pair of straddle packers 1003 can be conveyed in the annulus 1005 of a production well by coiled tubing 1007 and positioned in the annulus 1005 at a measured depth corresponding to the position of the aperture of a feature 1009 in the production well. The pair of straddle packers 1003 can be positioned and set at measured depths above and below the aperture of the feature 1009 to isolate an interval of the production well that intersects the feature 1009. For example, the packers may be set within approximately 2, 5, 10, 15, or 30 feet of the aperture of the feature 1009. In this example, the production well is completed with casing 1011 that is cemented by cement 1013 to the formation 1015 at least in the interval where the feature 1009 intersects the production well. Frac fluid 1017 (which can include a liquid slurry with proppant) is pumped down the coiled tubing 1007 under pressure to the hydraulic fracturing downhole tool 1001. The hydraulic fracturing downhole tool 1001 is configured to inject the pressurized frac fluid through one or more perforations in the production well though the aperture of the feature 1009 and into the feature 1009. The pressurized frac fluid creates hydraulic fracture in rock at or near the aperture of the feature 1009. The hydraulic fracture can propagate radially away from the production well the radial length 1024 during the hydraulic fracturing operation as shown.

The frac fluid can include a propping agent or proppant 1019, which can aid in keeping the hydraulic fracture open after the hydraulic fracturing operation is completed. In some embodiments, the high-pressure of the frac fluid may be greater than 3000 psi, 5000 psi, 10000 psi, up to 15000 psi. In embodiments, the pressure of the frac fluid injected into the feature 1009 can be controlled relative to a determined fracturing pressure for the formation, wherein the fracturing pressure for the formation is a pressure configured to exceed minimum horizontal stress of the formation to create tensile fracture which is propped open with the propping agent or proppant 1019. The minimum horizontal stress of the formation to create the tensile fracture may be determined prior to the intervention by stimulation. The minimum horizontal stress of the formation and the corresponding fracturing pressure for the formation may be determined at least in part from drilling data (e.g., mud pressure data), leak off test, injection-falloff test, step rate test, or any combination thereof. In some embodiments, the pressure of the frac fluid 1017 injected into the feature 1019 can be configured to not exceed minimum horizontal stress to create shear fractures in the rock. Such shear fractures do not need any propping agent. The resulting fractures can increase flow area and reduce pressure loss at or near the aperture of the feature. The resulting fractures can increase the flow rate of pressurized geothermal fluid carried by the feature into the production well. For applications where the production well is completed by a cemented casing 1011, 1013 or liner in the interval that is intersected by the feature 1009, the completion can be perforated (as discussed above) to expose the rock at or near the aperture of the feature 1009. For cases where the feature 1009 intersects the annulus 1005 of the production well about the circumference of the production well, the hydraulic fracturing can extend about the circumference of the production well. The hydraulic fracturing can be localized with respect to the aperture of the feature 1009 by setting the inflatable packers (straddle packers 1003) at measured depths above and below the aperture of the feature 1009.

Figure 11:
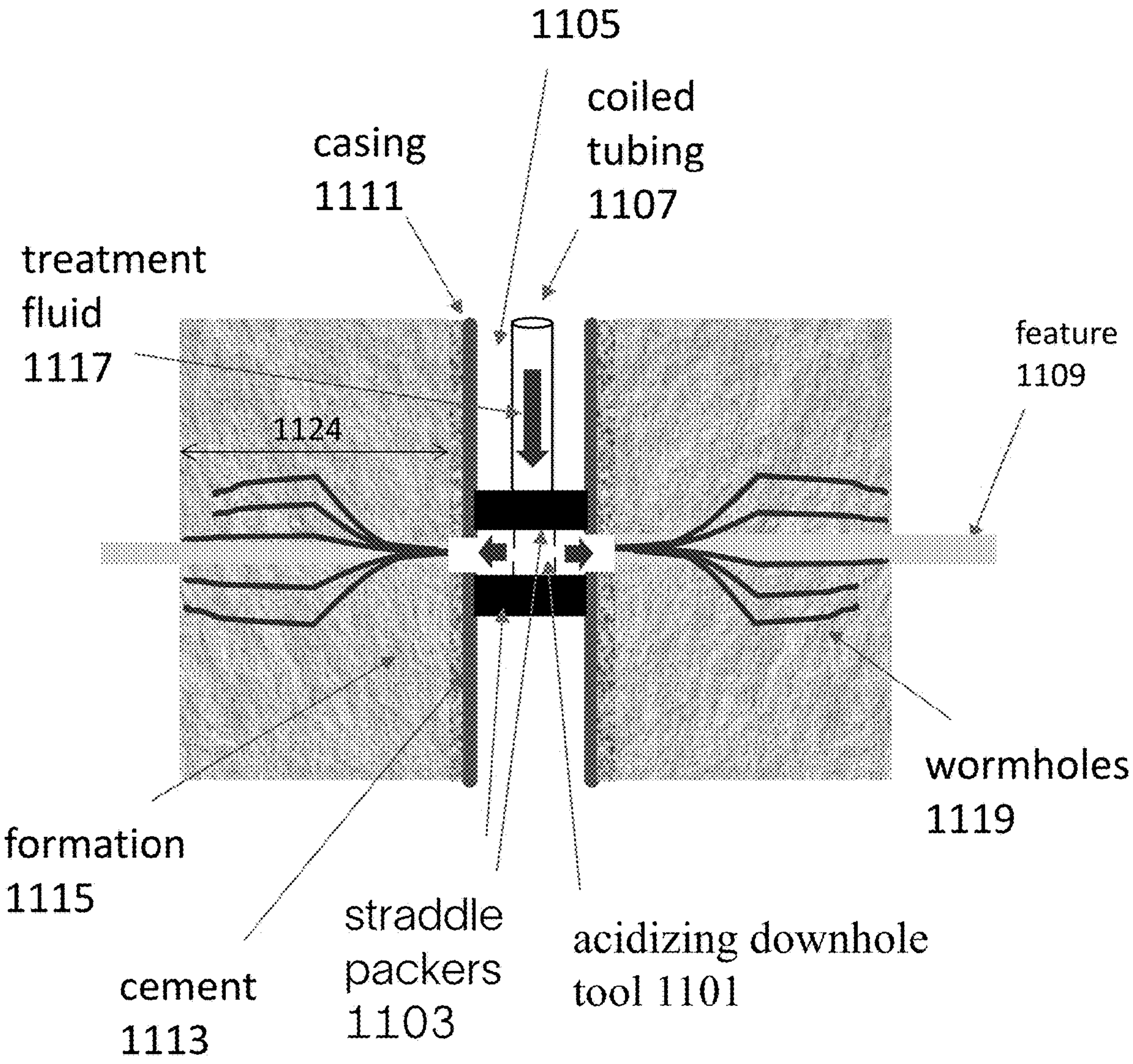
FIG. 11 is a schematic diagram of an exemplary acidizing downhole tool deployed in the annulus of a production well at or near the intersection of a feature of a geothermal reservoir, and flow channels or wormholes created by operation of the tool that are fluidly connected to the feature in accordance with the present disclosure.

In other embodiments, the stimulating can include acidizing as shown in FIG. 11. An acidizing downhole tool 1101 having a pair of straddle packers 1103 can be conveyed in the annulus 1105 of a production well by coiled tubing 1107 and positioned in the annulus 1105 at a measured depth corresponding to the position of the aperture of a feature 1109 in the production well. The pair of straddle packers 1103 can be positioned and set at measured depths above and below the aperture of the feature 1109 to isolate an interval of the production well that intersects the feature 1109. For example, the packers may be set within approximately 2, 5, 10, 15, or 30 feet of the aperture of the feature 1109. In this example, the production well is completed with casing 1111 that is cemented by cement 1113 to the formation 1115 at least in the interval where the feature 1109 intersects the production well. A treatment fluid 1117 (which includes an acid-based solution that chemically reacts with the rock and dissolves the rock) is pumped down the coiled tubing 1107 under pressure to the acidizing downhole tool 1101, which operates to inject the treatment fluid through one or more perforations in the production well through the aperture of the feature 1109 and into the feature 1109. The treatment fluid 1117 chemically reacts with rock and dissolves the rock in the area at or near the aperture of the feature 1109 as shown. This opens new channels or wormholes 1119 in the rock where such new channels 1119 are fluidly connected to the feature 1109. The resulting channels 1119 can increase flow area and reduce pressure loss at the aperture of the feature 1109. The resulting channels 1119 can increase the flow rate of pressurized geothermal fluid carried by the feature 1109 into the production well. The channels 1119 in the rock can propagate radially a radial length 1124 away from the production well during the acidizing operation as shown. For applications where the production well is completed by a cemented casing 1111, 1113 or liner in the interval that is intersected by the feature 1109, the completion can be perforated (as discussed above) to expose the rock at or near the aperture of the feature 1109. For cases where the feature 1109 intersects the annulus of the production well about the circumference of the production well, the acidizing stimulating can extend about the circumference of the production well. The acidizing can be localized with respect to the aperture of the feature 1109 by setting the inflatable packers (straddle packers 1103) at measured depths above and below the aperture of the feature 1109.

Figure 12:
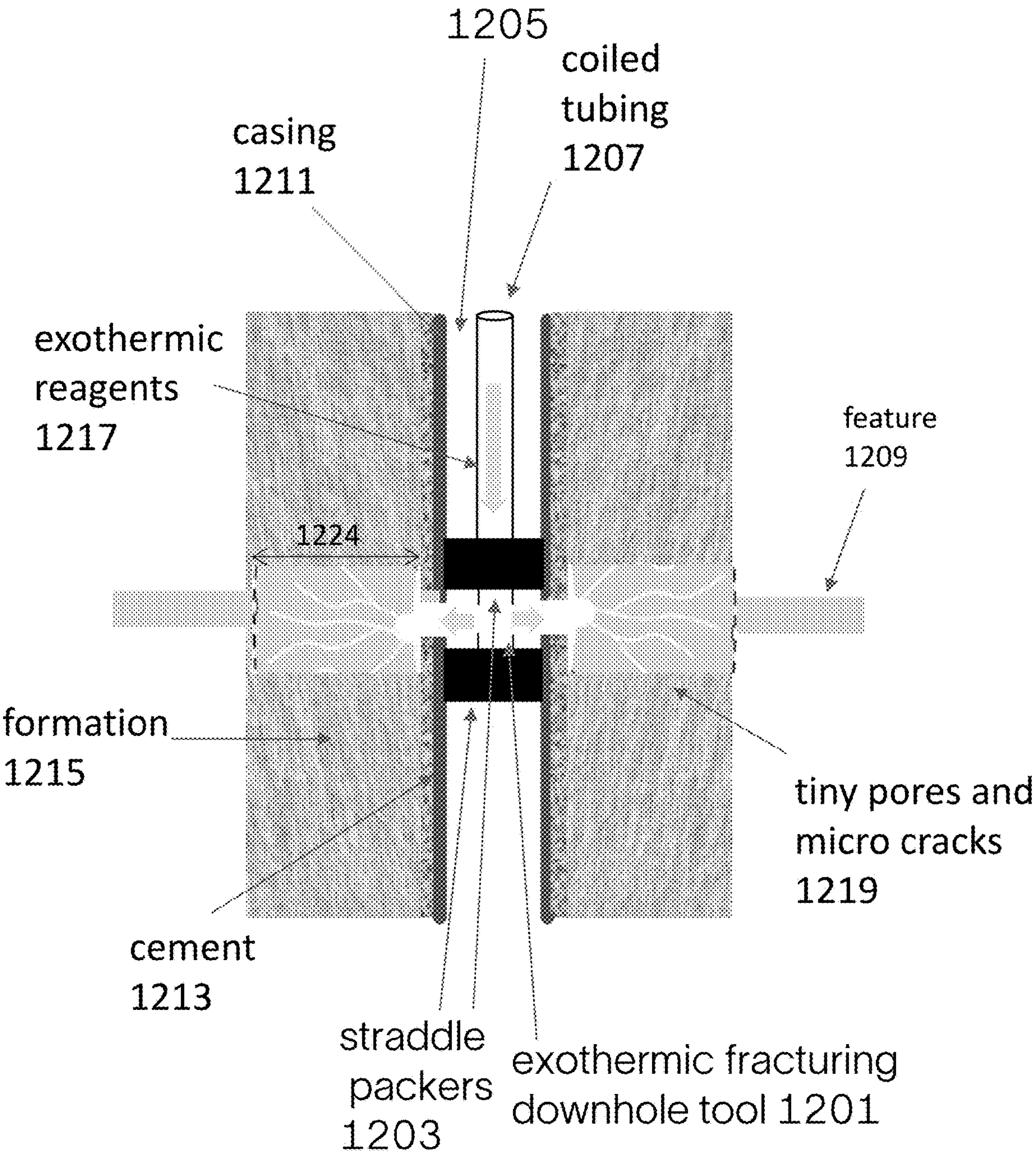
FIG. 12 is a schematic diagram of an exemplary exothermic fracturing downhole tool deployed in the annulus of a production well at or near the intersection of a feature of a geothermal reservoir, and additional fractures created by operation of the tool that opens and enlarges the feature at the intersection of the feature and the production well in accordance with the present disclosure.

In other embodiments, the stimulating can include exothermic fracturing as shown in FIG. 12. An exothermic fracturing downhole tool 1201 having a pair of straddle packers 1203 can be conveyed in the annulus 1205 of a production well by coiled tubing 1207 and positioned in the annulus 1203 at a measured depth corresponding to position of the aperture of a feature 1209 in the production well. The pair of straddle packers 1203 can be positioned and set at measured depths above and below the aperture of the feature 1209 to isolate an interval of the production well that intersects the feature 1209. For example, the packers may be set within approximately 2, 5, 10, 15, or 30 feet of the aperture of the feature 1209. In this example, the production well is completed with casing 1211 that is cemented by cement 1213 to the formation 1215 at least in the interval where the feature 1209 intersects the production well. Exothermic reagents 1217 are supplied or loaded into the exothermic fracturing downhole tool 1201. The exothermic fracturing downhole tool 1201 combines the exothermic reagents 1217, which undergo an exothermic chemical reaction that creates a shock wave directed at or near the aperture of the feature 1209. The shock wave is configured to create submicron pores and/or micro-fractures 1219 in the rock, enlarge the aperture, and open the feature 1209. The opened feature 1209 can increase flow area and reduce pressure loss at the aperture of the feature 1209 to the production well. The submicron pores and/or micro-fractures 1219 can increase the flow rate of pressurized geothermal fluid carried by the feature 1209 into the production well. The submicron pores and/or micro-fractures 1219 can propagate radially away from the production well during the exothermic fracturing operation as shown.

The exothermic reagents 1217 may include salts and water, such as calcium-chlorine, calcium-bromine, magnesium-chlorine, and magnesium-bromine. These or other exothermic reagents 1217 may be mixed at or near the exothermic fracturing downhole tool 1201 prior to being directed toward the aperture of the feature 1209. For applications where the production well is completed by a cemented casing 1211, 1213 or liner in the interval that is intersected by the feature 1209, the completion can be perforated to expose the rock at or near the aperture of the feature 1209. For cases where the feature 1209 intersects the production well about the circumference of the production well, the perforation can extend about the circumference of the production well. The exothermic fracturing can be localized with respect to the aperture of the feature 1209 by setting the inflatable packers (straddle packers 1203) at measured depths above and below the aperture of the feature 1209.

Figure 13:
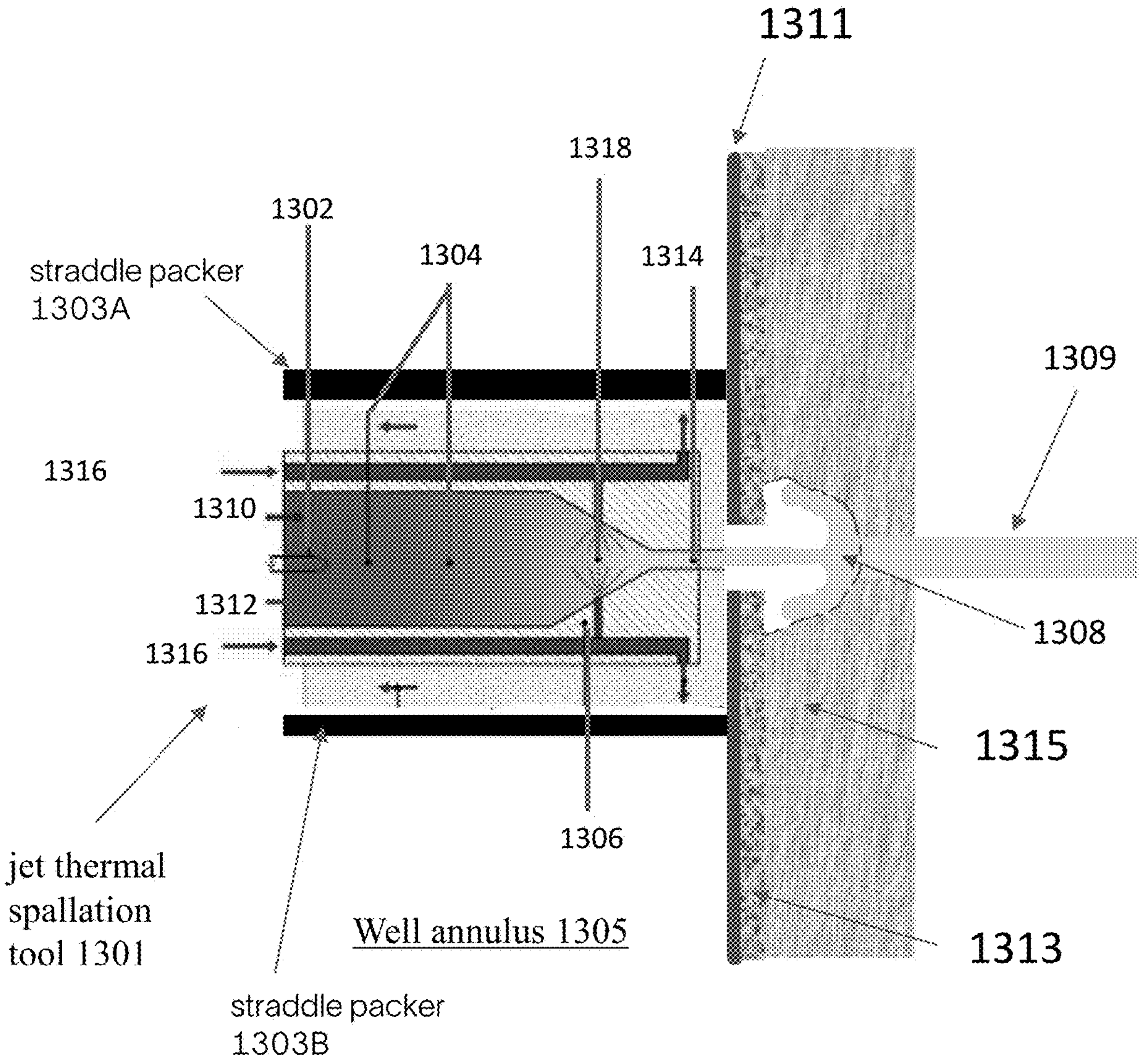
FIG. 13 is a schematic diagram of an exemplary jet thermal spallation downhole tool deployed in the annulus of a production well at or near the intersection of a feature of a geothermal reservoir, and additional void space created by operation of the tool that opens and enlarges the feature at the intersection of the feature and the production well in accordance with the present disclosure.

In yet other embodiments, the stimulation treatment can include jet thermal spallation as shown in FIG. 13. A jet thermal spallation downhole tool 1301 having a pair of straddle packers 1303A, 1303B can be conveyed in the annulus 1305 of a production well by coiled tubing or other conveyance means and positioned in the annulus 1305 at a measured depth corresponding to the position of the feature 1309 in the production well. The pair of straddle packers 1303A, 1303B can be positioned and set at measured depths above and below the aperture of the feature 1309 to isolate an interval of the production well that intersects the feature 1309. For example, the packers may be set within approximately 2, 5, 10, 15, or 30 feet of the aperture of the feature 1309. In this example, the production well is completed with casing 1311 that is cemented by cement 1313 to the formation 1315 at least in the interval where the feature 1309 intersects the production well. The jet thermal spallation downhole tool 1301 includes an igniter 1302, a combustion chamber 1304, and a nozzle 1306. The jet thermal spallation downhole tool 1301 is operated to produce a high-temperature flame 1308 by combustion of a mixture of an oxygen source 1310 (such as air, oxygen) and fuel 1312, and directs the high-temperature flame 1308 from an outlet 1314 towards rock at or near the aperture of the feature 1309. The flame 1308 may have a temperature differential in the range of 50 to 150 degree Celsius greater than the temperature of the rock of the formation 1315. The interaction impact of the high-temperature flame 1308 on the formation induces thermal stress that breaks portions of the formation, thereby opening the feature 1309. Thus, the high-temperature flame 1308 may be configured to increase flow area and reduce pressure loss at the aperture of the feature 1309. The resulting enlargement of the aperture can increase the flow rate of pressurized geothermal fluid carried by the feature 1309 into the production well.

Figure 14:
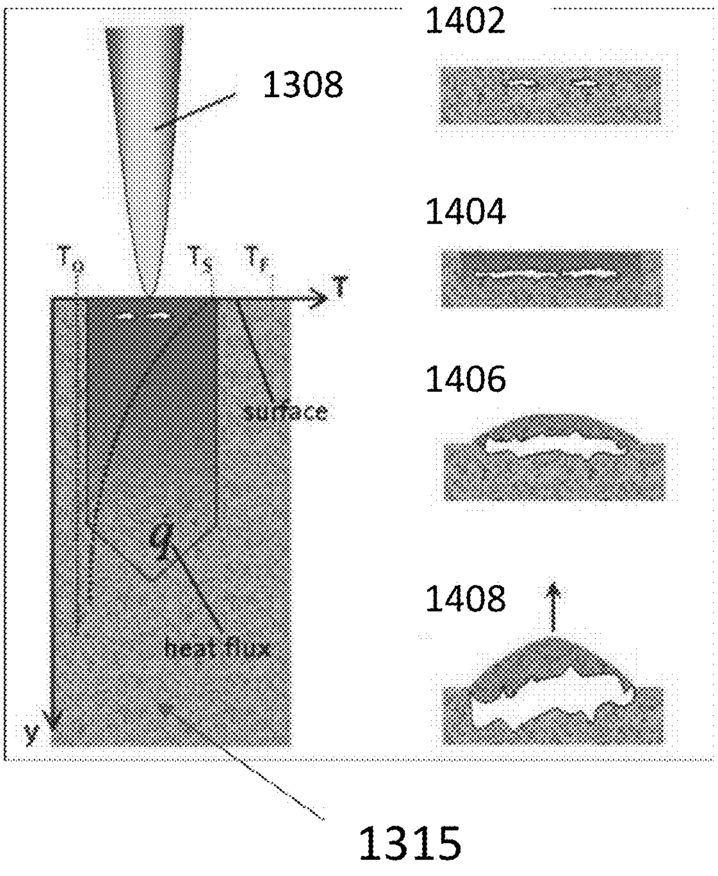
FIG. 14 includes schematic diagrams that depict the physical transformation of rock over time that is caused by the thermal jet emitted from the jet thermal spallation downhole tool of FIG. 13.

Concurrent with the emission of the high-temperature flame 1308, the jet thermal spallation downhole tool 1301 may be configured to supply cooling fluid 1316 to the isolated interval to cool the tool 1301 and carry rock debris (cuttings) away from the nozzle area of the tool 1301 as shown. In some embodiments, a portion of the cooling fluid 1316 may be directed to a quenching zone 1318 between the combustion chamber 1304 and the outlet 1314 to control the temperature of the nozzle 1306. Additionally or in the alternative, the cooling fluid 1316 may cool the straddle packer 1303 and/or the casing 1311. For applications where the production well is completed by a cemented casing 1311, 1313 or liner in the interval that is intersected by the feature 1309, the completion can be perforated to expose the rock at or near the aperture of the feature. For cases where the feature 1309 intersects the production well about the circumference of the production well, the perforation can extend about the circumference of the production well. FIG. 14 shows the physical transformation of the formation from the interaction of the flame 1308 over time during the jet thermal spallation process. As shown at 1402, flaws such as cracks or pores may be present prior to the jet thermal spallation process or form at the onset of the jet thermal spallation process. The flaws may grow and combine due to the heating and thermal jet force interactions with the formation 1315, as shown at 1404. Thermal expansion of the flaws and/or the formation itself may cause buckling of the heated formation, as shown at 1406. In some embodiments, the buckling may occur while the flame 1308 is applied to the formation or after the flame 1308 is removed. The jet thermal spallation process may cause a portion 1409 of the formation 1315 to fracture and be removed from the formation 1315, as shown at 1408. Removal of an outer surface of the formation 1315 may expose another layer of the formation 1315 that may directly interact with the flame 1308 of the jet thermal spallation tool, and repeat the process shown by 1402-1408. The jet thermal spallation can be localized with respect to the aperture of the feature 1309 by setting the inflatable packers (straddle packers 1303A, 1303B) at measured depths above and below the aperture of the feature 1309.

In still other embodiments, the stimulation treatment can include jet quench spallation. A jet quench spallation downhole tool having a pair of straddle packers can be conveyed in the annulus of production well by coiled tubing or other conveyance means and positioned in the annulus of the production well at a measured depth corresponding to the position of the feature in the production well. The pair of straddle packers can be positioned and set at measured depths above and below the aperture of a feature to isolate an interval of the production well that intersects the feature. For example, the packers may be set within approximately 2, 5, 10, 15, or 30 feet of the aperture of the feature 1309. The jet quench spallation downhole tool is operated to emit high-velocity low temperature fluid (e.g., at fluid at a velocity in the range of 20 to 300 m/s creating a differential temperature in the range of 50 to 100 degree Celsius less than the temperature of the rock) that impacts rock at or near the aperture of the feature. The contact of the low temperature fluid on hot rock creates rapid cooling and induces thermoelastic stress alterations that breaks the rock of the formation 1309 to open the feature. The enlargement of the aperture can increase flow area and reduce pressure loss at the aperture of the feature. The enlargement of the aperture can increase the flow rate of pressurized geothermal fluid carried by the feature into the production well. The low temperature fluid may include, but is not limited to a chilled drilling fluid, refrigerant, liquified carbon dioxide, liquified nitrogen, a cryogenic fluid, or any combination thereof. The jet quench spallation process may be similar as shown in FIG. 14, except that cracks or pores form from thermal contraction of the affected region of the formation rather than thermal expansion. Furthermore, the low temperature fluid may embrittle the affected region such that continued application of the jet of low temperature fluid may fracture and remove portions of the formation.

For applications where the production well is completed by a cemented casing or liner in the interval that is intersected by the feature, the completion can be perforated to expose the rock at or near the aperture of the feature. For cases where the feature intersects the production well about the circumference of the production well, the perforation can extend about the circumference of the production well. The jet quench spallation can be localized with respect to the aperture of the feature by setting the inflatable packers (straddle packers) at measured depths above and below the aperture of the feature.

Figure 15:
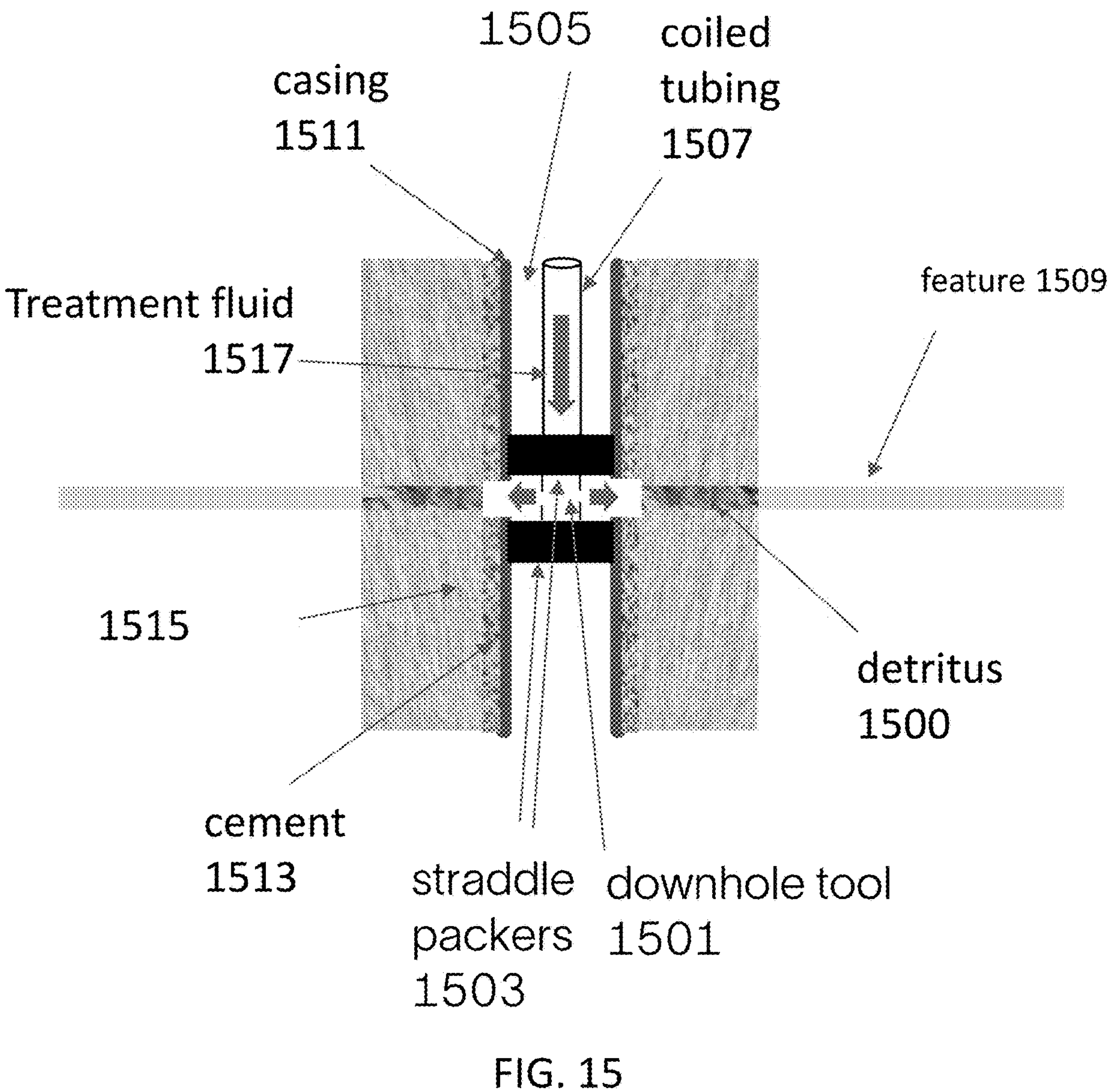
FIG. 15 is a schematic diagram of an exemplary stimulation treatment deployed to dissolve or break up detritus in the annulus of a production well at or near the intersection of a feature of a geothermal reservoir in accordance with the present disclosure.

In still other embodiments, the stimulation treatment can include dissolving, washing away, or breaking up detritus as shown in FIG. 15. Note that the detritus may include, but is not limited to fractured portions of the formation, cuttings of casing, liner, or cement, and sand, among others. The detritus 1500 can form when the drilling trajectory of the production well intersects the feature 1509. The detritus 1500 may be fluid and/or solid particles of drilling fluid that is imbibed by some part of the feature 1509 within several feet (e.g., 1-3 feet) away from the production wellbore. The detritus 1500 can act as a critical choking mechanism that blocks or limits flow of the geothermal fluid from the formation 1515 through the feature 1509 into the production well. A downhole tool 1501 having a pair of straddle packers 1503 can be conveyed in the annulus 1505 of a production well by coiled tubing 1507 and positioned in the annulus 1503 at a measured depth corresponding to the position of the feature 1509 in the production well. The pair of straddle packers 1503 can be positioned and set at measured depths above and below the aperture of the feature 1509 to isolate an interval of the production well that intersects the feature 1509. In this example, the production well is completed with casing 1511 that is cemented by cement 1513 to the formation 1515 at least in the interval where the feature 1509 intersects the production well. A treatment fluid 1517 (which includes a solvent that dissolves or breaks apart the detritus 1500) can be pumped down the coiled tubing 1507 under pressure to the downhole tool 1501, which operates to inject the treatment fluid through the aperture of the feature 1509 and into the feature 1509. The treatment fluid 1517 chemically reacts with the detritus 1500 to breaks apart the detritus 1500. In some embodiments, the treatment fluid 1517 facilitate entrainment and removal of the detritus via the pressurized geothermal fluid flowing into the production well. In some embodiments, the treatment fluid 1517 cleanses the feature and washes away the detritus from the aperture of the feature 1509. The resulting dissolving or breakup of the detritus 1500 can increase flow area and reduce pressure loss at the aperture of the feature 1509. The resulting dissolving or breakup of the detritus 1500 can increase the flow rate of pressurized geothermal fluid carried by the feature 1509 into the production well. For applications where the production well is completed by a cemented casing 1511, 1513 or liner in the interval that is intersected by the feature 1509, the completion can be perforated to expose the rock at or near the aperture of the feature 1509. For cases where the feature 1509 intersects the production well about the circumference of the production well, the perforation can extend about the circumference of the production well. The dissolution or breakup of the detritus 1500 can be localized with respect to aperture of the feature 1509 by setting the inflatable packers (straddle packers 1503) at measured depths above and below the aperture of the feature 1509. The dissolution or breaking up of the detritus can be combined with one or more other interventions described herein and performed prior to such interventions as a pretreatment. Alternatively, the dissolution or breaking up of the detritus can be performed as a standalone operation.

While the interventions involving stimulation are discussed separately above and illustrated in separate drawings, it is understood that one or more stimulating actions described above may be performed at or near a feature that intersects the production well. That is, a hydraulically fractured feature may be subsequently acidized and/or cleaned with a treatment fluid. Moreover, the stimulating action performed for a first feature that intersects a production well may be different than a stimulating action performed for a second feature that intersects the production well. For example, a thermal spallation stimulation may be performed at or near a first feature, and an acidizing treatment may be performed at or near a second feature. Furthermore, it is understood that any of the stimulating actions described above may be performed prior to or subsequent to any of the perforating actions described above. That is, an abrasive fluid jet perforation may be followed by a mud cleaning treatment or acidizing treatment.

Intervention Involving Cutting

In embodiments, the intervention of block 207 can involve cutting rock at the aperture to open the feature. In some embodiments, the rock cutting can extend about the full circumference of the production well. The rock cutting at or near the feature can increase flow area and reduce pressure loss at the aperture of the feature. The extent of the rock cutting (i.e., the radial length of the cutting or enlargement in the radial direction into the formation away from the production well) can be limited by the design and operation of the downhole tool and the cutting process itself. In embodiments, the extent of the rock cutting (i.e., the radial length of the rock cutting or enlargement in the radial direction into the formation away from the production well) can extend radially less than 2 feet into the near wellbore region of the formation at the intersection of the feature and the production well.

Figure 16A:
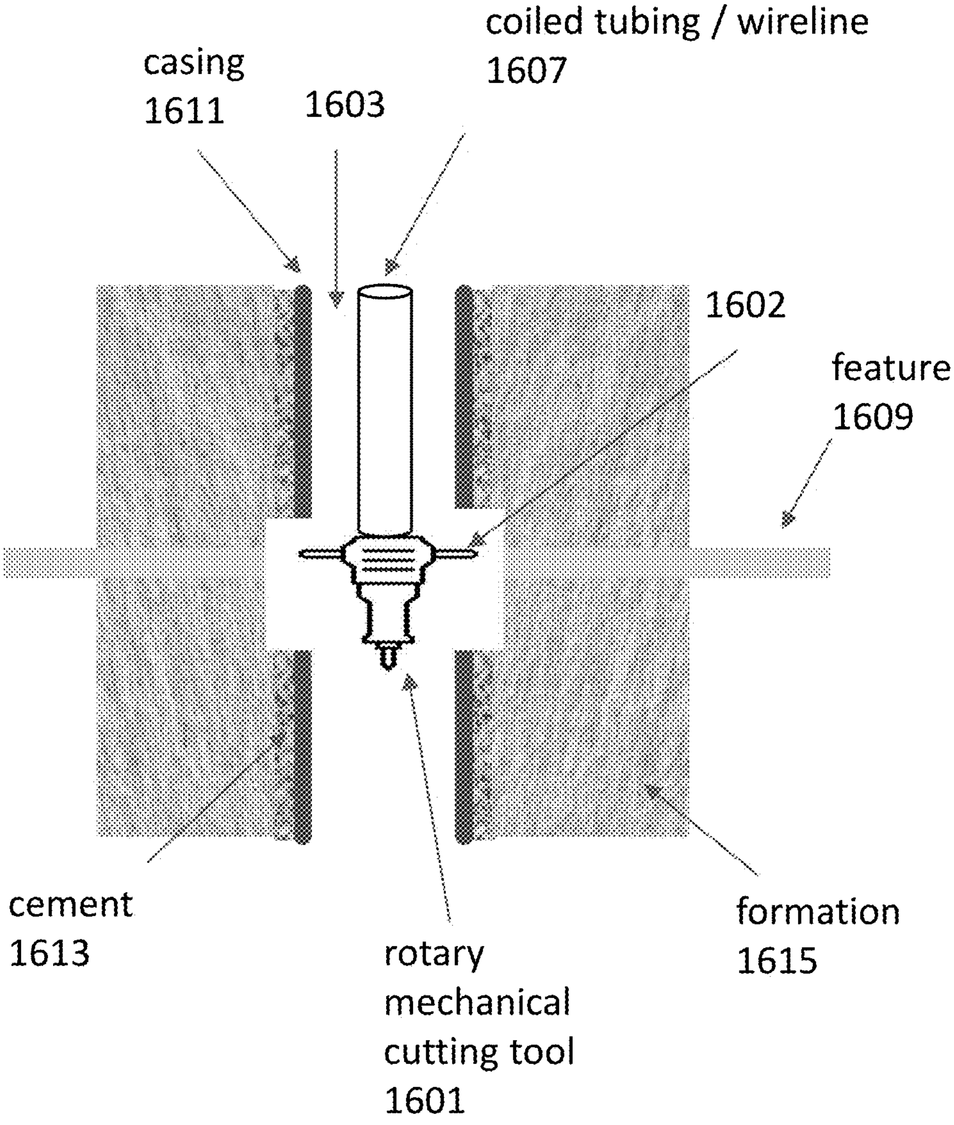
FIG. 16A and FIG. 16B are schematic diagrams of exemplary cutting downhole tools deployed in the annulus of a production well at or near the intersection of a feature of a geothermal reservoir in accordance with the present disclosure.

In embodiments, the rock cutting can employ a cutting downhole tool 1601 as shown in FIG. 16A. The cutting downhole tool 1601 can be conveyed in the annulus 1603 of a production well on coiled tubing or wireline or other conveyance means 1607 to a measured depth corresponding to the position of the feature 1609 in the production well, and operated to cut rock by mechanical cutting or abrasion in the area at or near the aperture of the feature 1609 about the full circumference of the production well. In some embodiments, the cutting downhole tool 1601 is a rotary cutting tool, such as a milling tool or reamer. The cutting downhole tool 1601 may be rotated within the production well to mechanically engage cutting surfaces 1602 with the full circumference of the production well. Rotation of the cutting downhole tool 1601 with extended cutting surfaces may be configured to enlarge the production well a radial length. Such cutting is a form of 360° cutting that enlarges the aperture of the feature 1609 about the full circumference of the production well, which can increase flow area and reduce pressure loss at the aperture of the feature 1609. In some embodiments, the cutting downhole tool 1601 may engage with a sector of the production well less than the full circumference of the production well, thereby forming a notch. For example, when the feature 1609 intersects one sector of the production well, the cutting downhole tool 1601 may engage the cutting surfaces 1602 to form a notch in the formation at or near the aperture in that sector. The cutting can increase the flow rate of pressurized geothermal fluid carried by the feature 1609 into the production well. In this example, the production well is completed with casing 1611 that is cemented by cement 1613 to the formation 1615 at least in the interval where the feature 1609 intersects the production well. The cutting can also be used cut through completion or wellbore components, such as casing and cement 1611, 1613 or liners, to provide access to the area at or near the aperture of the feature 1609.

Figure 16B:
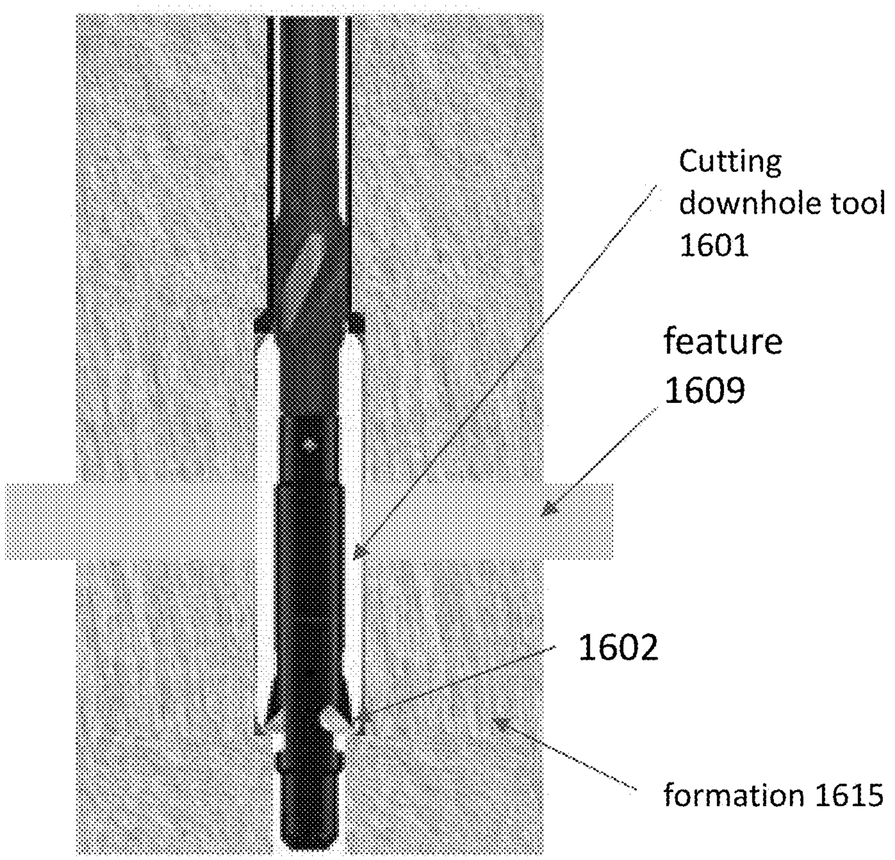

In some embodiments, the cutting downhole tool 1601 is a milling tool or reamer as shown in FIG. 16B that may be actuated to extend cutting surfaces 1602 toward the casing, liner, cement, or formation of the production well. A reamer may include a rotatable tool body with retractable blades 1602 that can be fully retained with the outer diameter of the tool body and then pivoted or activated into an extended "cutting" configuration beyond the outer diameter of the tool body. The blades include cutting elements that contact the formation in the extended "cutting configuration" and cut rock. This operation underreams the production wellbore to enlarge the wellbore past is originally drilled size by impacting and cutting the rock in the area at or near the aperture of the feature 1609 about the full circumference of the production wellbore. In some embodiments, the cutting downhole tool 1601 may be a reamer, such as a Reamaster-XTU, a drilling-type underreamer, or a Rhino system reamer, available from SLB of Houston, TX.

Figure 17:
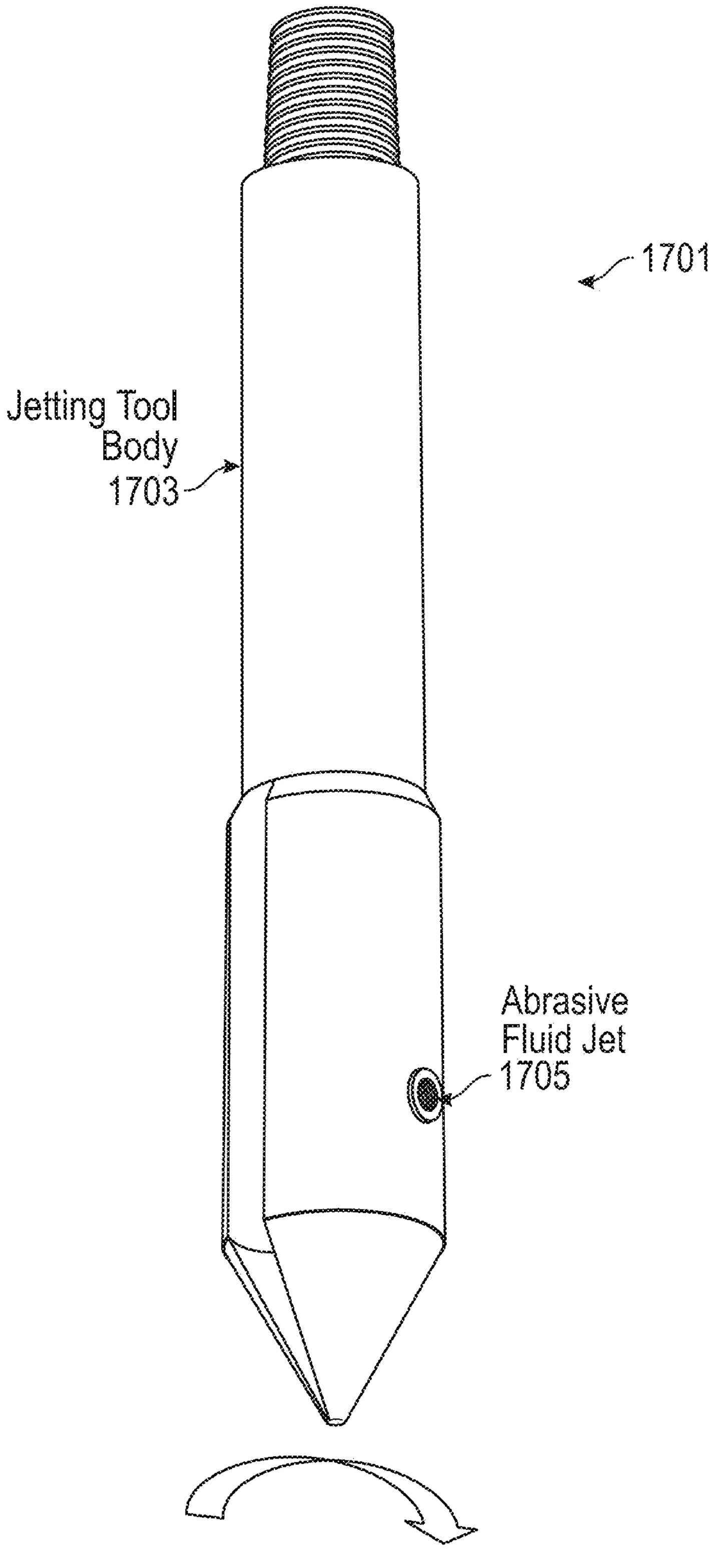
FIG. 17 is a schematic diagram of an exemplary abrasive fluid jet downhole tool that can be deployed in the annulus of a production well at or near the intersection of a feature of a geothermal reservoir in accordance with the present disclosure.

In other embodiments, the cutting can employ cutting tool 1701 having a jetting tool body 1703 that emits one or more high-velocity abrasive fluid jets 1705 as shown in FIG. 17. The high-velocity fluid jet 1705 may be directed from the jetting tool body 1703 in a predetermined direction. That is, the jetting tool body 1703 may have a tool face from which the high-velocity fluid jets are directed, and the tool face may be rotated within the production well to a desired orientation. The jetting tool body 1703 is conveyed in the annulus of a production well on coiled tubing or wireline or other conveyance means to a measured depth corresponding to the position of a feature in the production well. Upon controlling the tool face of the jetting tool body 1703 to a desired orientation, an abrasive fluid may be pumped to the cutting tool 1701 and through the jetting tool body 1703 to direct the fluid jet 1705 at high pressure toward the formation at or near the aperture of the feature with the production well. In some embodiments, the jetting tool body 1703 may be rotated while the abrasive fluid is pumped through the jetting tool body 1703. Thus, the jetting tool body 1703 may be controlled to direct the fluid jet 1705 toward a desired point of the production well, a sector of the production well, or the full circumference of the production well. The cutting tool 1701 may include a turbine in the jetting tool configured to rotate the fluid jet 1705 in addition to or independent of rotation of the remainder of the cutting tool 1701. In some embodiments, the cutting tool 1701 may include jets offset from the center of the cutting tool 1701 configured to rotate the fluid jet 1705. The abrasive fluid may be a sand, slurry, acid, entrained proppant, or any combination thereof. The fluid jet 1705 of the abrasive fluid may have a velocity in the range of 20 to 120 m/s.

As the tool body 1703 rotates, the fluid jet 1705 may cut the rock in the area at or near the aperture of the feature about the full circumference of the production well. Such cutting by the fluid jet 1705 opens the aperture of the feature, which can increase flow area and reduce pressure loss at the aperture of the feature. The cutting by the fluid jet 1705 can increase the flow rate of pressurized geothermal fluid carried by the feature into the production well. The cutting by the fluid jet 1705 can also be used cut through completion or wellbore components, such as casing and cement or liners, to provide access to the area at or near the intersection of the feature and the production well.

Figure 18:
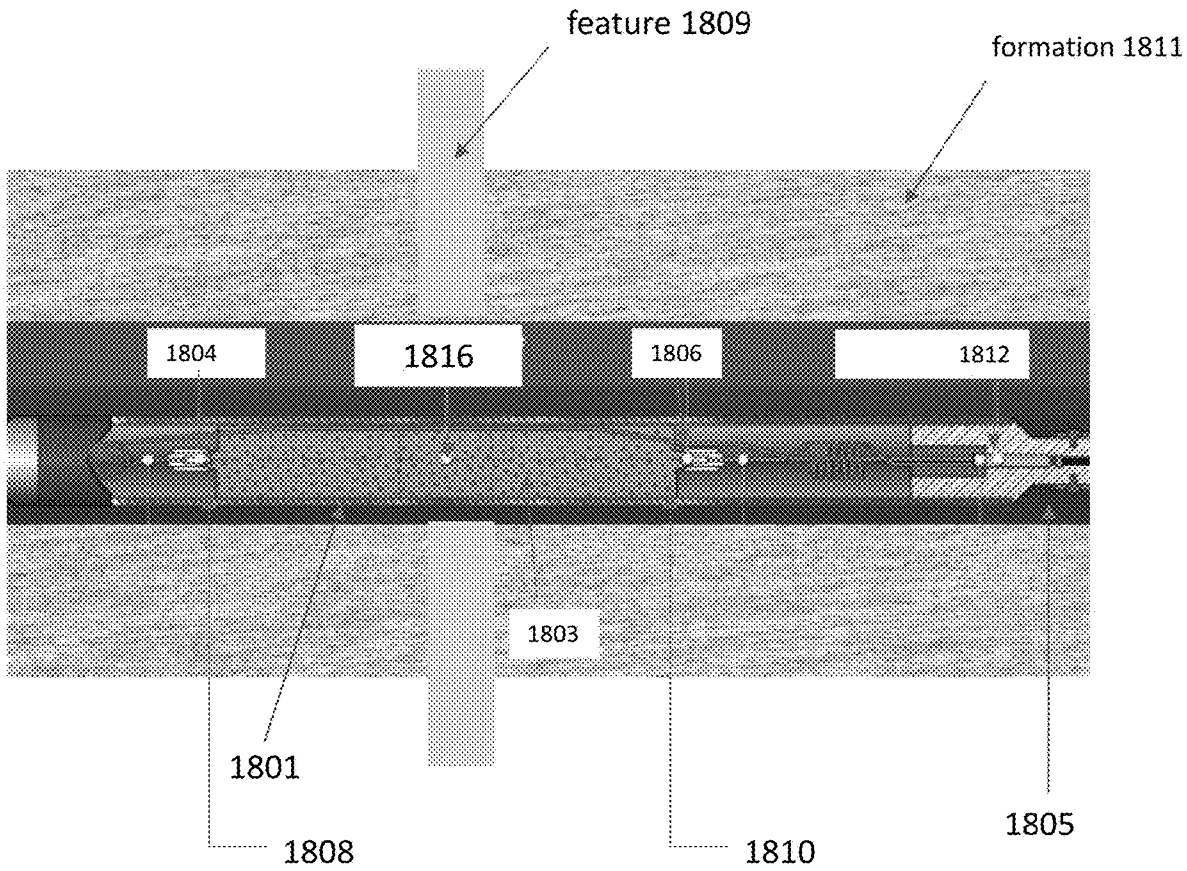
FIG. 18 is a schematic diagram of an exemplary a colliding downhole tool deployed in the annulus of a production well at or near the intersection of a feature of a geothermal reservoir in accordance with the present disclosure.

In still other embodiments, the cutting can employ a colliding tool 1801 as shown in FIG. 18. The colliding tool 1801 uses detonation at opposite ends of an explosive charge 1803. For example, an explosive charge 1803 of the colliding tool 1801 is arranged with a first booster 1804 and a second booster 1806 at opposite ends. That is, the first booster 1804 may be arranged at an upstream end 1808, and the second booster 1806 may be arranged at a downstream end 1810 of the explosive charge 1803. A detonating cord 1812 connected to both the first booster 1804 and the second booster 1806 initiates simultaneous detonation of both ends of the explosive charge 1803. The detonation of the charge 1803 generates shock waves from the opposite ends 1808, 1810 that propagate toward each other create a resonant energy that is diverted perpendicular to an impact point 1816 of the shock waves. The resonant explosive energy is sufficient to cut through thick steel.

Figure 19:
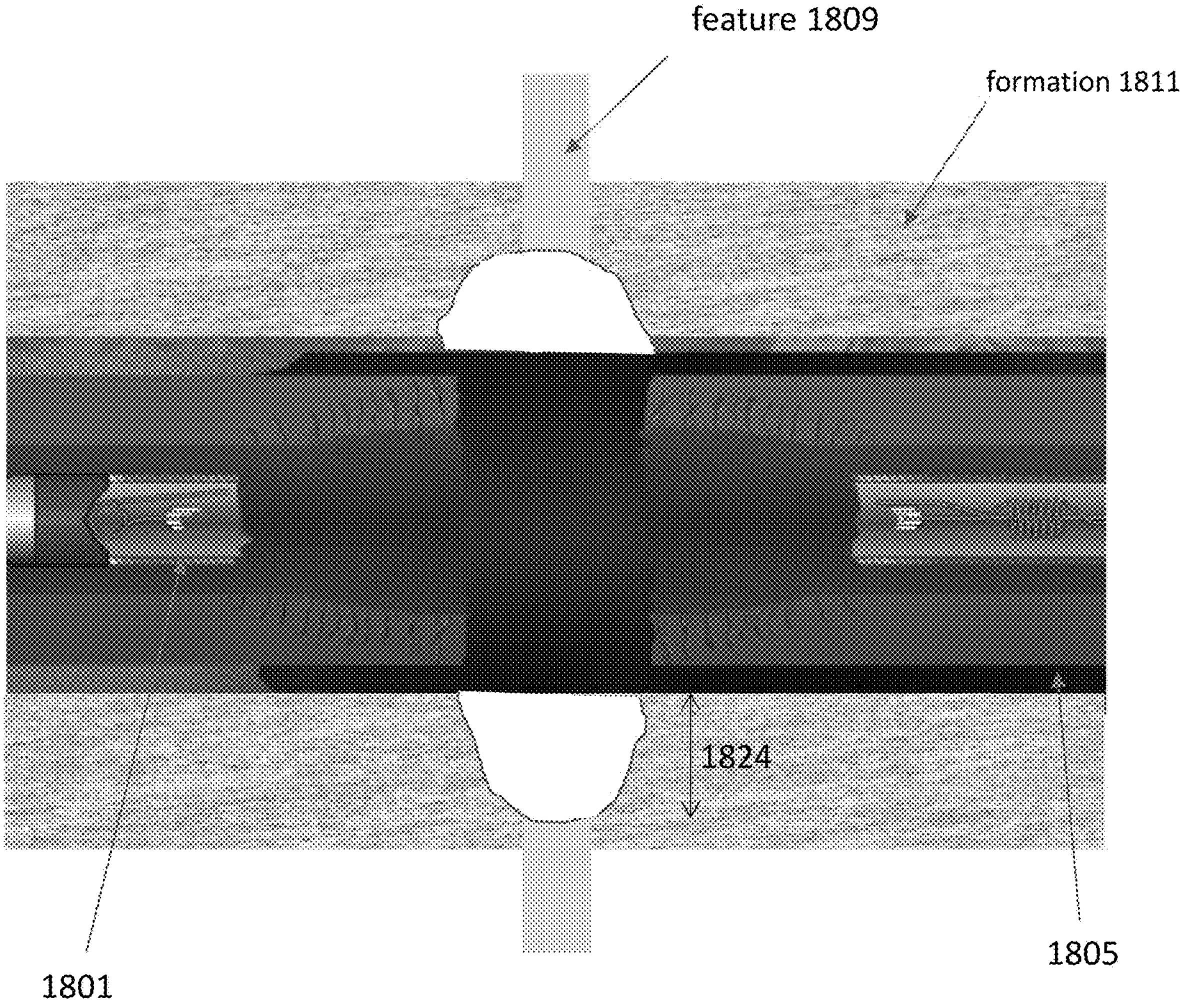
FIG. 19 is a schematic diagram that illustrates additional void space created by operation of the colliding downhole tool of FIG. 18 that opens and enlarges the feature at the intersection of the feature and the production well in accordance with the present disclosure.

The colliding tool 1801 can be conveyed in the annulus 1805 of a production well on coiled tubing or wireline or other conveyance means to a measured depth corresponding to the position of the feature 1809 in the production well with the explosive charge 1803 overlapping or adjacent to the aperture of the feature 1809. The feature 1809 extends through the formation 1811 as shown. The explosive charge 1803 is detonated and the resulting energy is directed radially a radial length 1824 toward the aperture of the feature 1809 about the full circumference of the production well. This energy removes rock in the area at or near the aperture of the feature 1809 about the full circumference of the production well as best shown in FIG. 19. This detonation is a form of 360° cutting that opens the aperture of the feature 1809 about the full circumference of the production well, which can increase flow area and reduce pressure loss at the aperture of the feature. The detonation of the colliding tool 1801 can increase the flow rate of pressurized geothermal fluid carried by the feature into the production well. The detonation of the colliding tool 1801 can also be used cut through completion or wellbore components, such as casing and cement or liners, to provide access to the area at or near the intersection of the feature and the production well.

While the interventions involving cutting are discussed separately above and illustrated in separate drawings, it is understood that one or more cutting actions described above may be performed at or near a feature that intersects the production well. That is, a notched or reamed feature may be subsequently acidized and/or cleaned with a treatment fluid. Additionally or in the alternative, a milling tool may be used to cut the casing and cement at or near an aperture prior to performing an abrasive jet or shaped charge perforation. Moreover, the cutting action performed for a first feature that intersects a production well may be different than a cutting action performed for a second feature that intersects the production well. For example, a production well may be reamed at or near a first feature, a colliding tool may be utilized to cut the formation at or near a second feature, and no cutting action may be performed at a third feature. Furthermore, it is understood that any of the perforating and stimulating actions described above may be performed prior to or subsequent to any of the stimulating actions described above.

Intervention Involving Additional Bore

Figure 20:
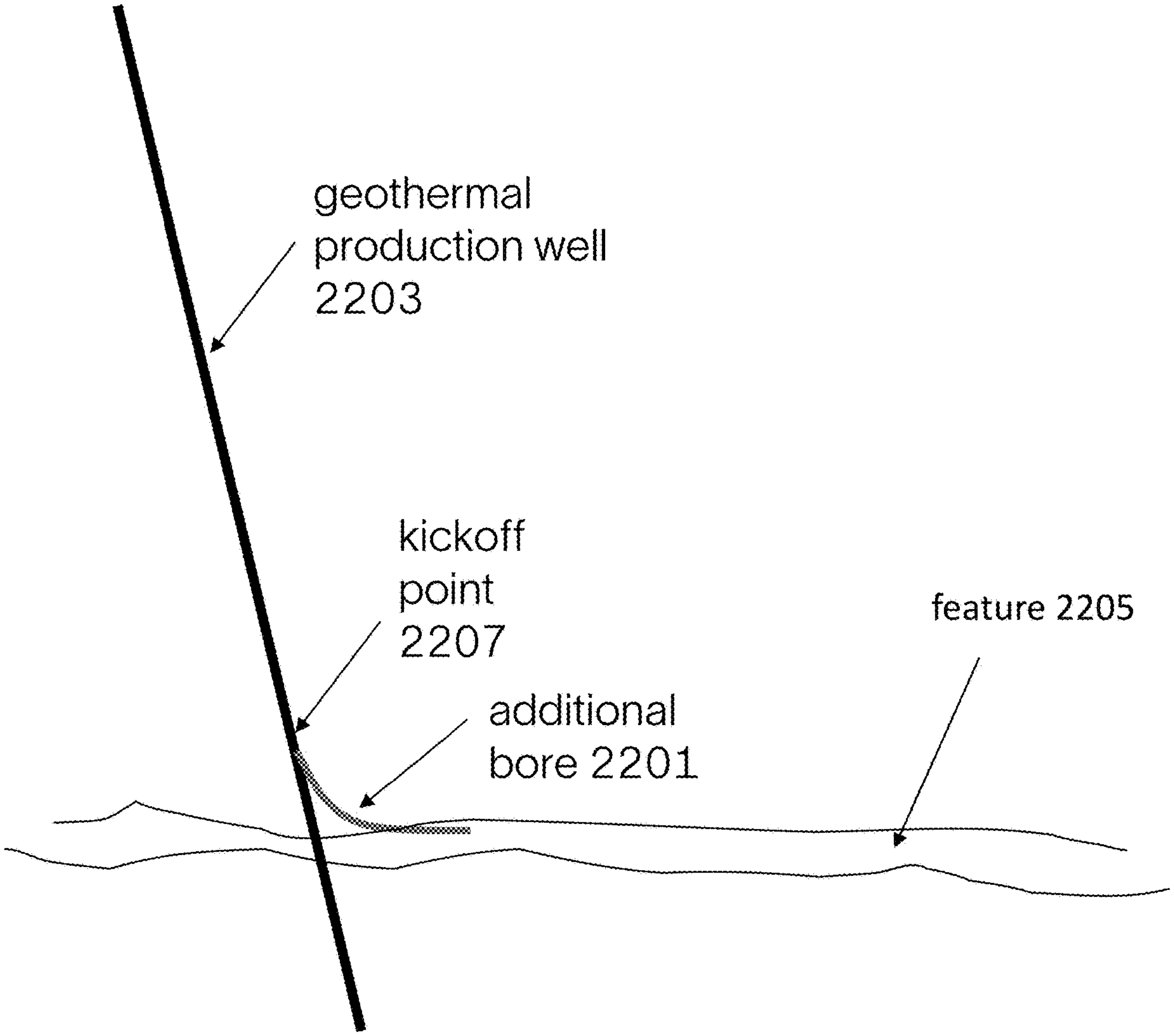
FIG. 20 is a schematic illustration of a production well that intersect a feature extending through a geothermal reservoir; directional drilling is used to drill one or more additional bores (one shown) that extend from the production well and intersect and connect to the feature in accordance with the present disclosure.

In embodiments, the intervention of block 207 can include one or more sidetracks drilled 2201 from a primary wellbore of a production well 2203, as shown in FIG. 20. The one or more sidetracks 2201 may extend from the primary production well 2203, and the one or more sidetracks 2201 as well as the production well 2203 intersect and connect to the feature 2205. This may increase the fluid flow through the feature 2205 that connects the injection well(s) and production well 2203 of the system, which can increase the amount of heat captured by the system and delivered to the surface. The one or more sidetracks (e.g., additional bores) may be formed via directional drilling, use of a whipstock tool having an inclined ramp surface to deflect one or more drill bits or mills toward the wall of the production well 2203. After the drilling operation for a sidetrack is completed, the drilling system may be partially withdrawn and placed/set for additional sidetracks 2201 to be completed. For example, a directional drilling system may be utilized to drill 2, 3, or more sidetracks 2201 from the production well 2203 through the feature of the formation within the geothermal reservoir. In some embodiments, a bit assembly, whipstock, and anchor may be retrieved and placed/set for drilling 2, 3, or more sidetracks 2201 from the production well through the feature. In some embodiments, one or more sidetracks 2201 may be drilled along or substantially parallel to the feature 2205. Subsequent interventions may be performed in the one or more sidetracks 2201. In some embodiments, the one or more interventions described above (e.g., perforation, stimulation, cutting) may be performed within the production well 2203 and the one or more sidetracks 2201. The one or more sidetracks 2201 may further reduce the pressure loss of pressurized geothermal fluid and increase the flow rate of the pressurized geothermal fluid into the production well 2203 from the feature 2205. Each of the sidetracks 2201 may have its own respective kickoff point 2207.

In embodiments, the intersection of the additional bore(s) 2201 and the feature 2203 is within an offset in the range of 1 foot to 200 feet away from the production well. In some embodiments, the sidetracks are drilled to penetrate the feature at a distance equal to or greater than a distance D from the production well 2203 intersection with the feature 2205. The distance D may correspond to at least five times the diameter of the production well 2203. In embodiments, the kickoff point 2207 of the additional bore(s) 2201 can be located above the intersection of the feature 2205 and the production well 2203 as shown. In embodiments, the kickoff point 2207 can be located at an offset of 1 foot to 200 feet away from the intersection of the feature 2205 and the production well. The additional bore(s) 2201 increase the contact area between the production well and the geothermal reservoir, enhancing the production of hot fluid from the geothermal reservoir.

In embodiments, at least a part of the production well 2203 that intersects the at least one feature 2205 and the one or more additional bores 2201 can be completed as an open wellbore, with a liner-type completion, with a cased cement completion or with another suitable completion.

Figure 21:
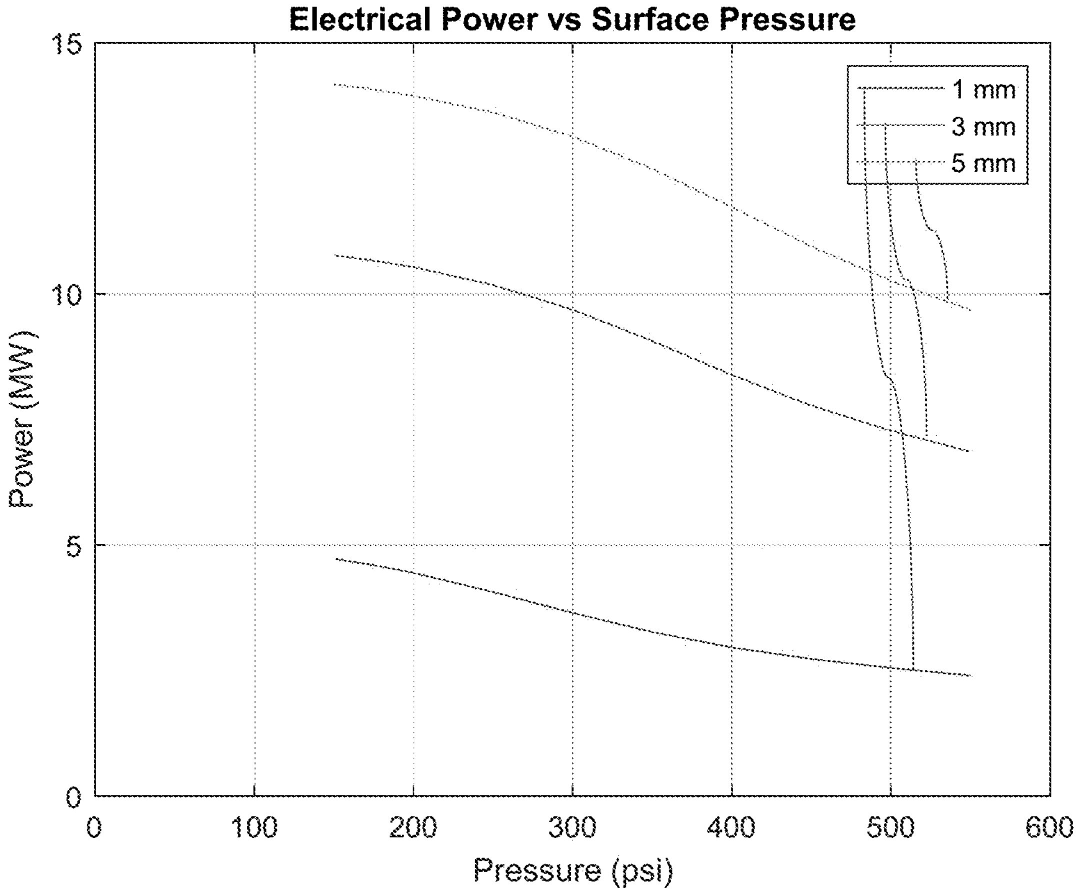
FIG. 21 depicts plots of simulation results of available power extracted from an example geothermal reservoir with varying aperture size (in the range of 1 mm, 3 mm and 5 mm) at the intersection of a feature and a production well.

FIG. 21 includes plots of available power from a geothermal system with varying fracture aperture size in the range of 1 mm, 3 mm and 5 mm. Note that an increase in fracture aperture size from 1 mm to 3 mm results in an increase in performance. Similarly, an increase in fracture aperture size from 3 mm to 5 mm results in a further increase in performance, which is even more that the increase that results from the 1 mm to 3 mm increase in fracture aperture size. The plots of FIG. 21 are derived from simulations, which assumes an 8.5 inch diameter for the production well, and the same pressure/temperature at the far field. The fracture is modelled as a disc. The pressure loss in the actual fracture is small compared to that at the aperture where the fracture enters the production well. The production well is flowed at different rates measuring pressure at the bottom of the production well to characterize the losses in the fracture and at the aperture where the fracture enters the production well.

While the interventions involving additional bores are discussed separately from other interventions, it is understood that each of the additional bores may have one or more interventions performed at or near an intersection of a feature. That is, a perforating, stimulating, and/or cutting action may be performed in one or more additional bores and a primary wellbore.

The supply of the fluid through coiled tubing to a downhole tool (e.g., abrasive jetting tool 501, jetting tool 1701) may affect the position of the downhole tool within the production well. For example, fluid pumped through coiled tubing to the abrasive jetting downhole tool 501 may elongate and/or straighten the coiled tubing between the surface and the abrasive jetting downhole tool 501. That is, the downhole tool may drift along the production well relative to the feature that intersects the production well during performance of the intervention (e.g., perforating, stimulating, cutting). Unless accounted for, this drift may negatively affect the placement of the perforating performed by the abrasive jetting downhole tool such that the intervention is not performed within the accuracy tolerance at or near the feature as desired. In some embodiments, one or more anchors may be coupled to the coiled tubing to reduce or eliminate axial drift of the downhole tool during performance of the intervention. The one or more anchors may be activated or set hydraulically, pneumatically, or electronically. The one or more anchors may be configured to engage with any completion type, such as a cased, lined, or open completion of the production well.

Enumerated Clauses:

Enumerated clauses are now provided for the purpose of illustrative some possible embodiments that may be provided in accordance with the disclosure. The clause sets provided below are for illustration and not to be construed as limiting, exclusive or exhaustive. Features recited in one clause set may be utilized and incorporated into one or more of the other clause sets.

Methods for extracting thermal energy from a geothermal reservoir are disclosed. The geothermal reservoir has at least one feature that extends through the geothermal reservoir. A production well can be drilled or accessed whereby the production well intersects the at least one feature. The at least one feature provides a flow path of pressurized geothermal fluid (e.g., hot water or brine) into the production well. Subsurface data can be analyzed to determine position of the at least one feature in the production well. One or more interventions (or combination of inventions) can be performed at a position in the production well that corresponds to the position of the at least one feature. The one or more interventions (or combination of inventions) can be configured to open the feature fracture or otherwise enhance the flow rate of pressurized geothermal fluid carried by the feature into the production well. The intervention(s) can be performed on multiple features that connect to the production well. The method can also be applied to multiple production wells that intersect the geothermal reservoir.

Clause Set 1

Embodiments disclosed herein may provide methods that involve perforating to open the feature. The perforating can increase flow area and reduce pressure loss to increase the flow rate of pressurized geothermal fluid carried by the feature into the production well. The perforating can extend through an aperture of the feature into the near wellbore region of the production well with a limited radial length less than 2 feet into the near wellbore region.

The perforating can involve one or more of the following downhole tools and associated downhole operations:

- a downhole tool configured to focus and/or direct a form of energy toward an aperture of the feature, wherein the energy removes rock to enlarge the aperture and open the feature;
- a downhole tool configured to focus and/or direct a high-velocity abrasive fluid or propellant or detonation of explosive charge(s) or a high-energy pulse toward an aperture of the feature, which remove rock to enlarge the aperture and open the feature.
- a downhole tool configured to direct a high-velocity fluid with abrasive particles toward an aperture of the feature, which removes rock to open the feature; the downhole tool can employ rotary motion to direct a jet or jets of the high-velocity fluid about the circumference of the production well.
- a downhole tool configured to focus or direct electromagnetic radiation toward an aperture of the feature, which removes rock to open the feature; the downhole tool can employ rotary motion to direct electromagnetic radiation about the circumference of the production well.
- a downhole tool configured to apply electrodes to an aperture of the feature, and to apply high-voltage impulses to the rock, wherein the applied impulses create shock waves that remove rock to enlarge the aperture and open the feature.
- a downhole tool configured to direct high-power laser toward an aperture of the feature, which breaks part and removes the rock to enlarge the aperture and open the feature.
- a downhole tool configured to support and detonate at least one explosive charge such that a high-energy pressure wave that results from the detonation is directed toward an aperture of the feature and the production well and removes rock to enlarge the aperture and open the feature.
- a downhole tool configured to support and detonate at least one linear shaped charge such that a high-energy pressure wave that results from the detonation is directed toward an aperture of the feature and removes rock to enlarge the aperture and open the feature; prior to detonating the at least one linear shaped charge, the downhole tool can be positioned in the production well such that a major length dimension of the at least one linear shaped charge is generally orthogonal to a major dimension of the aperture; the major length dimension of the at least one linear shaped charge can be larger than a minor height dimension of the aperture.
- a downhole tool configured to direct a combustion wave toward an aperture of the feature, which removes rock to enlarge the aperture and open the feature; the combustion wave can be generated by igniting a lower-energy propellant that produces a propagating flame front, The flame front can propagate by transferring heat and mass to an unburned oxygen source and vapor mixture ahead of the flame front.

In embodiments, well log data can be analyzed to determine position of the feature in the production well. Prior to the perforating, the one or more downhole tools can be deployed or conveyed in the production well to a position that corresponds to the position of the at least one feature in the production well.

In embodiments, at least a part of the production well that intersects the at least one feature can be completed as an open wellbore, with a liner-type completion, with a cased cement completion or with another suitable completion.

Clause Set 2

Embodiments disclosed herein may provide methods that involve stimulating to open a feature. The stimulating can increase the flow rate of pressurized geothermal fluid carried by the feature into the production well. The stimulating can be localized with respect to an aperture of the feature by setting inflatable packers at measured depths in the production well above and below the aperture of the feature. The stimulating can extend about the circumference of the production well. The stimulating can extend through an aperture of the feature into the near wellbore region of the production well with a limited radial length in the range of 2 feet to 50 feet into the near wellbore region.

The stimulating can involve one or more of the following downhole tools and associated downhole operations:

- a downhole tool configured to inject high-pressure frac fluid into the feature to hydraulically fracture rock and open the feature.
- a downhole tool configured to inject frac fluid or water into the feature to generate a network of shear fractures in rock and open the feature.
- a downhole tool configured to inject an acid-based treatment fluid into the feature, wherein the treatment fluid chemically reacts with rock and dissolves the rock to create new channels or wormholes that are fluidly connected to the feature and open the feature.
- a downhole tool configured to combine exothermic reagents that undergo an exothermic chemical reaction that creates a shock wave, and direct the shock wave into the feature, wherein the shock wave creates sub-micron pores and/or micro-fractures in rock and opens the feature.
- a downhole tool configured to produce a high-temperature flame and direct the high-temperature flame into the feature, wherein the high-temperature flame induces thermal stress that breaks rock and opens the feature; the high-temperature flame can be produced by combustion of a mixture of an oxygen source and fuel.
- a downhole tool configured to direct a high-velocity low temperature fluid into the feature, wherein the high-velocity low temperature fluid rapidly cools rock to break rock and opens the feature; contact of the low temperature fluid on hot rock creates rapid cooling and induces thermoelastic stress alterations that breaks rock and opens the feature.
- a downhole tool configured to inject treatment fluid into the feature, wherein the treatment fluid chemically reacts with fracture damage and dissolves or breaks apart the fracture damage and opens the feature.

In embodiments, well log data can be analyzed to determine position of the feature in the production well. Prior to the stimulating, the one or more downhole tools can be deployed or conveyed in the production well to a position that corresponds to the position of the at least one feature in the production well.

In embodiments, at least a part of the production well that intersects the at least one feature can be completed as an open wellbore, with a liner-type completion, with a cased cement completion or with another suitable completion.

Clause Set 3

Embodiments disclosed herein may provide methods that involve cutting rock or enlarging the feature at an aperture of the feature.

Cutting rock can employ one or more of the following downhole tools and associated downhole operations:

- a rotary mechanical cutting/notching tool that is operated to cut rock by mechanical cutting or abrasion about the circumference of the production well at the aperture of the feature.
- a rotatable tool body that emits a high-velocity abrasive fluid jet, wherein the tool body is rotated and the abrasive fluid jet impacts and cuts rock by abrasion about the circumference of the production well at the aperture of the feature.
- a colliding tool that detonates opposite ends of an explosive charge to generate and propagate shock waves and direct energy that cuts rock about the circumference of the production well at the aperture of the feature.
- an underreamer tool that cuts rock about the circumference of the production well at the aperture of the feature.

In embodiments, well log data can be analyzed to determine position of the feature in the production well. Prior to cutting rock, the one or more downhole tools can be deployed or conveyed in the production well to a position that corresponds to the position of the at least one feature.

In embodiments, at least a part of the production well that intersects the at least one feature can be completed as an open wellbore, with a liner-type completion, with a cased cement completion or with another suitable completion.

Clause Set 4

Embodiments disclosed herein may provide methods that use drilling (such as directional drilling) to drill at least one additional bore that extend from the production well and intersects the feature. The at least one additional bore increase the contact area between the production well and the geothermal reservoir, which can enhance the production of hot fluid from the geothermal reservoir.

In embodiments, the intersection of the at least one additional bore and the feature can be within an offset in the range of 1 foot to 200 feet away from the production well.

In embodiments, the at least one additional bore can have a kickoff point located above the intersection of the feature and the production well.

In embodiments, the kickoff point can be located at an offset of 1 foot to 200 feet away from the intersection of the feature and the production well.

In embodiments, the at least one additional bore can include a plurality of bores that connect to the production well at kickoff points that are distributed at varying azimuths about the production well.

In embodiments, at least a part of the production well that intersects the at least one feature and the at least one additional bore can be completed as an open wellbore, with a liner-type completion, with a cased cement completion or with another suitable completion.

There have been described and illustrated herein several embodiments of geothermal systems and related methods used to capture and extract thermal energy from a geothermal reservoir. While particular configurations have been disclosed in reference to the geothermal systems and related methods, it will be appreciated that other configurations could be used as well. It will therefore be appreciated by those skilled in the art that yet other modifications could be made to the provided invention without deviating from its spirit and scope as claimed.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

What is claimed is:

1. A method for extracting thermal energy from a geothermal reservoir having a feature that extends through the geothermal reservoir, the method comprising:

analyzing subsurface data to determine an intersection of the feature with a production well in the geothermal reservoir, wherein the feature provides a flow path of geothermal fluid into the production well;

performing a first intervention at a position in the production well that corresponds to the intersection, wherein the first intervention comprises perforating by combusting a propellant to generate a combustion wave towards the intersection and is configured to increase a first flow rate of the geothermal fluid from the feature into the production well; and performing a second intervention at the position in the production well, wherein the second intervention comprises stimulating.

2. The method of claim 1, wherein the geothermal fluid comprises at least one of hot water and brine.

3. The method of claim 1, wherein the first intervention comprises perforating by directing a high-velocity fluid towards the intersection, wherein the high-velocity flow comprises abrasive particles.

4. The method of claim 1, wherein the first intervention comprises perforating by emitting high-energy electromagnetic radiation towards the intersection, wherein the high-energy electromagnetic radiation comprises a high-voltage impulse greater than 100 kV or a high-power laser greater than 10 kW.

5. The method of claim 1, wherein the second intervention comprises stimulation by injection of a high-pressure frac fluid into the feature to hydraulically fracture formation and open the feature.

6. The method of claim 1, wherein the second intervention comprises stimulation by injecting an acid-based treatment fluid into the feature, wherein the treatment fluid dissolves rock to create wormholes that are fluidly connected to the feature.

7. The method of claim 1, wherein the second intervention comprises stimulation by mixing exothermic reagents that undergo an exothermic chemical reaction at the intersection.

8. The method of claim 1, wherein the second intervention comprises stimulation by spallation of a high-velocity fluid jet towards the intersection, wherein a temperature difference between the high-velocity fluid jet and a formation at the intersection induces thermal stresses configured to open the feature.

9. The method of claim 1, wherein the second intervention comprises stimulation by injection of a treatment fluid towards the intersection, wherein the treatment fluid comprises a solvent configured to dissolve detritus in the production well.

10. A method for extracting thermal energy from a geothermal reservoir having a feature that extends through the geothermal reservoir, the method comprising:

analyzing subsurface data to determine an intersection of the feature with a production well in the geothermal reservoir, wherein the feature provides a flow path of geothermal fluid into the production well;

performing a first intervention at a position in the production well that corresponds to the intersection, wherein the first intervention comprises detonating a colliding tool to interface with a formation about a circumference of the production well, and the first intervention is configured to increase a first flow rate of the geothermal fluid from the feature into the production well;

setting a packer at a measured depth above the intersection; and performing a second intervention at the position in the production well, wherein the second intervention comprises stimulating.

11. The method of claim 10, wherein the second intervention comprises stimulation by injecting an acid-based treatment fluid into the feature, wherein the treatment fluid dissolves rock to create wormholes that are fluidly connected to the feature.

12. The method of claim 10, wherein the first intervention comprises cutting the production well with a cutting tool, wherein the cutting tool comprises a milling tool or an expandable reamer.

13. The method of claim 12, comprising performing a third intervention at the position, wherein the first intervention comprises milling a tubular completion component to open an aperture through the tubular completion component to the feature, and the third intervention comprises perforating the feature, wherein the third intervention is performed between the first intervention and the second intervention.

14. The method of claim 10, wherein the first intervention comprises directing a high-velocity fluid towards the intersection, and the second intervention comprises stimulation by injection of a high-pressure frac fluid into the feature to hydraulically fracture formation and open the feature.

15. A method for extracting thermal energy from a geothermal reservoir having a feature that extends through the geothermal reservoir, the method comprising:

analyzing subsurface data to determine an intersection of the feature with a completed open wellbore portion of a production well in the geothermal reservoir, wherein the feature provides a flow path of geothermal fluid into the production well;

performing a perforating intervention at a position in the production well that corresponds to the intersection, wherein the perforating intervention is configured to increase a first flow rate of the geothermal fluid from the feature into the production well;

setting a packer at a measured depth above the intersection;

performing a stimulating intervention at the position in the production well; and performing a third intervention at the position, wherein the third intervention comprises underreaming the production well, wherein the third intervention is performed before the perforating intervention and the stimulating intervention.

16. The method of claim 15, wherein the perforating intervention comprises directing a high-velocity fluid towards the intersection, wherein the high-velocity flow comprises abrasive particles, and the stimulating intervention comprises injecting an acid-based treatment fluid into the feature, wherein the treatment fluid dissolves rock to create wormholes that are fluidly connected to the feature.

17. The method of claim 15, wherein the perforating intervention comprises detonating a colliding tool, and the stimulation intervention comprises injection of a high-pressure frac fluid into the feature to hydraulically fracture formation and open the feature.

18. A method for extracting thermal energy from a geothermal reservoir having a feature that extends through the geothermal reservoir, the method comprising:

analyzing subsurface data to determine an intersection of the feature with a production well in the geothermal reservoir, wherein the feature provides a flow path of geothermal fluid into the production well;

performing a first intervention at a position in the production well that corresponds to the intersection, wherein the first intervention comprises perforating by emitting high-energy electromagnetic radiation towards the intersection, wherein the high-energy electromagnetic radiation comprises a high-voltage impulse greater than 100 kV or a high-power laser greater than 10 KW, and the first intervention is configured to increase a first flow rate of the geothermal fluid from the feature into the production well; and performing a second intervention at the position in the production well, wherein the second intervention comprises stimulating.

19. The method of claim 18, wherein the second intervention comprises stimulation by injection of a high-pressure frac fluid into the feature to hydraulically fracture formation and open the feature.

20. The method of claim 18, wherein the second intervention comprises stimulation by injecting an acid-based treatment fluid into the feature, wherein the treatment fluid dissolves rock to create wormholes that are fluidly connected to the feature.

* * * * *